US009887614B1

(12) United States Patent
Horsky et al.

(10) Patent No.: US 9,887,614 B1
(45) Date of Patent: Feb. 6, 2018

(54) APPARATUS, SYSTEMS AND METHODS FOR AVERAGE CURRENT CONTROL IN A BUCK DC/DC LED DRIVER

(71) Applicant: SEMICONDUCTOR COMPONENTS INDUSTRIES, LLC, Phoenix, AZ (US)

(72) Inventors: Pavel Horsky, Brno (CZ); Jean-Paul Eggermont, Pellaines (BE); Jan Plojhar, Mokra Horakov (CZ); Martin Musil, Rajec-Jestrebi (CZ); Paul Andrem Decloedt, Wortegem-Petegem (BE)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 15/382,980

(22) Filed: Dec. 19, 2016

Related U.S. Application Data

(60) Provisional application No. 62/410,937, filed on Oct. 21, 2016.

(51) Int. Cl.
*H02M 1/08* (2006.01)
*H02M 3/156* (2006.01)
(Continued)

(52) U.S. Cl.
CPC ............ *H02M 1/08* (2013.01); *H02M 3/156* (2013.01); *H05B 33/0815* (2013.01); *H02M 1/12* (2013.01); *H02M 2001/0009* (2013.01)

(58) Field of Classification Search
CPC ............ H05B 33/0815; H05B 33/0818; H05B 33/0851; H05B 33/0839; H05B 33/0842;
(Continued)

(56) References Cited

U.S. PATENT DOCUMENTS 6,885,568 B2 * 4/2005 Kernahan ............. H02M 3/157
363/132
7,009,370 B2 * 3/2006 Deaton ............... H02M 3/1584
323/272
(Continued)

OTHER PUBLICATIONS

U.S. Appl. No. 15/378,517, "Apparatus, systems and methods for average current and frequency control in a synchronous buck DC/DC LED driver", filed Dec. 14, 2016, by Eggermont.*
(Continued)

*Primary Examiner* — Haissa Philogene
(74) *Attorney, Agent, or Firm* — Wash Park IP Ltd.; John T. Kennedy

(57) ABSTRACT

Various embodiments of apparatuses, systems and methods for regulating the currents provided by a DCDC buck converters to an LED unit are provided. In accordance with at least one embodiment, a regulating module operable to instruct and regulate the periods during which a first switch of a driver module, used to control the operation of a buck converter module, is configured into at least one of the first operating state and the second operating state such that the maximum and minimum currents provided by the buck converter module to a load, such as an LED unit, over a given duty cycle are symmetrically disposed about an average current provided to the LED unit during the duty cycle, where the average current provided is substantially equal to a target current for the LED unit.

20 Claims, 11 Drawing Sheets

(51) Int. Cl.
*H05B 33/08* (2006.01)
*H02M 1/00* (2006.01)
*H02M 1/12* (2006.01)

(58) Field of Classification Search
CPC ............ H05B 33/0887; H05B 33/0803; H05B 41/2828; H05B 41/3927; H02M 1/08; H02M 3/33569; H02M 3/33507; H02M 3/156; H02M 3/157; H02M 1/0845; H02M 1/4225; H02M 2001/0009; H02M 2001/0035; H02M 2001/0012; H02M 2001/008; H02M 2001/4291; Y02B 20/346; Y02B 20/347; Y02B 20/186; Y02B 70/1433; Y02B 70/1491; Y02B 70/1466
USPC ............... 315/247, 224, 291, 307, 312, 360; 323/211, 282, 283; 363/21.04, 97, 132
See application file for complete search history.

(56) References Cited

U.S. PATENT DOCUMENTS

| | | | |
|---|---|---|---|
| 7,280,375 B2 | 10/2007 | Joos | |
| 7,511,437 B2* | 3/2009 | Lys | H02M 1/4225 315/224 |
| 7,888,881 B2* | 2/2011 | Shteynberg | H05B 33/0815 315/247 |
| 7,888,890 B2 | 2/2011 | Joos et al. | |
| 8,193,795 B2* | 6/2012 | Zhou | H02M 3/156 323/283 |
| 8,461,502 B2 | 6/2013 | Gianordoli et al. | |
| 8,994,347 B2* | 3/2015 | Galbis | H03F 1/0216 323/271 |
| 9,161,411 B1 | 10/2015 | Dunn et al. | |
| 9,247,608 B2* | 1/2016 | Chitta | H02M 1/08 |
| 9,270,122 B2 | 2/2016 | Stoger | |
| 2013/0038210 A1 | 2/2013 | Stoger | |
| 2015/0367777 A1 | 12/2015 | Dunn et al. | |

OTHER PUBLICATIONS

Allegro MicroSystems LLC, "Automotive High Current LED Controller," A6268 Data Sheet, Rev. 3, [retrieved on Dec. 5, 2016]. Retrieved from the Internet. <URL: http://www.allegromicro.com/en/Products/Regulators-And-Lighting/LED-Drivers-For-Lighting/A6268.aspx>.
ON Semiconductor, "350 mA High Efficiency Step Down LED Driver," CAT4201/D Data Sheet, Sep. 2015, Rev. 9, [retrieved on Dec. 5, 2016]. Retrieved from the Internet: <URL: http://www.onsemi.com/PowerSolutions/extSearch.do?query=cat4201d&param1=type&param1_val=document>.
NXP, "ASL3416SHN: Three-channel Automotive LED Buck Driver," [retrieved on Dec. 8, 2016]. Retrieved from the Internet: <URL: http://www.nxp.com/products/power-management/lighting-driver-and-controller-ics/automotive-lighting-led-driver-ics/three-channel-automotive-led-buck-driver:ASL3416SHN>.
Diodes Incorporated, "ZXLD1350 30V 350mA LED Driver with AEC-Q100," ZXLD1350 Data Sheet, Mar. 2011, Rev. 8-2, [retrieved on Dec. 5, 2016]. Retrieved from the Internet. <URL: http://www.diodes.com/search?type=0&value=ZXLD1350>.
Infineon LITIX Power, "700mA High Integration—DC/DC Step-Down Converter," TLD5045EJ Data Sheet, May 28, 2015, Rev. 1.0, [retrieved on Dec. 9, 2016]. Retrieved from the Internet. <URL: http://www.infineon.com/dgdl/Infineon-TLD5045EJ-DS-v01_00-EN.pdf?fileId=db3a304330f6860601310a21ecb200b1>.
Micrel Inc., "High-Brightness LED Driver Controller with High-Side Current Sense," MAQ3203 Data Sheet, Apr. 20, 2015, Rev. 1.2, [retrieved on Dec. 5, 2016] . Retrieved from the Internet. <URL: http://ww1.microchip.com/downloads/en/DeviceDoc/maq3203.pdf>.
ON Semiconductor, "Up to 1.5 A Constant Current Switching Regulator for LEDs with ON/OFF Function," NCP3066, NCV3066 Data Sheet, Jan. 2009, Rev. 3, [retrieved on Dec. 9, 2016]. Retrieved from the Internet. <URL: http://www.onsemi.com/pub_link/Collateral/NCP3066-D.PDF>.
ON Semiconductor, "Buck/Boost/Inverting Regulator, Switching, Constant Current, 1.5 A, for HB-LEDs," NCP3065 Data Sheet, Rev. 3, May 2009, [retrieved on Dec. 5, 2016]. Retrieved from the Internet. <URL: https://www.onsemi.com/PowerSolutions/search.do?query=ncv3065&tabbed=Y&clearFilters=Y&searchType=others>.
ON Semiconductor, "Up to 1.5 A Constant Current Switching Regulator for LEDs," NCP3065, NCV3065 Data Sheet May 2009, Rev. 3, [retrieved on Dec. 5, 2016]. Retrieved from the Internet. <URL: http://www.onsemi.com/pub_link/Collateral/NCP3065.PDF>.
Rohm Semiconductor, "White LED Driver IC for Automotive lamp (Switching regulator type)," BD8381EFV-M Technical Note, Oct. 2010, Rev. 0.11, [retrieved on Dec. 5, 2016]. Retrieved from the Internet. <URL: http://www.rohm.com/web/global/news-detail?news-title=rohm-delivers-industry-s-first-single-chip-led-driver-for-automotive-headlamps-and-running-lights%EF%BC%81&defaultGroupId=false>.
Rohm Semiconductor, "Automotive White LED Driver IC," BD8112EFV-M Technical Note, Sep. 2009, Rev. B, [retrieved on Dec. 5, 2016]. Retrieved from the Internet. <URL: https://media.digikey.com/pdf/Data%20Sheets/Rohm%20PDFs/BD8112EFV-M.pdf>.
Supertex, Inc., "Universal High Brightness LED Drive," HV9910 Data Sheet 2004, [retrieved on Dec. 9, 2016]. Retrieved from the Internet. <URL: http://www.microchip.com/wwwproducts/en/hv9110>.
Texas Instruments, "LM3401 Hysteretic PFET Controller for High Power LED Drive,"LM3401 Data Sheet, Aug. 2007, Rev. May 2013 [retrieved on Dec. 9, 2016]. Retrieved from the Internet. <URL: http://www.ti.com/lit/ds/symlink/lm3401.pdf>.
Texas Instruments, "350 mA, Constant Current Output Floating Buck Switching Converter for High Poer LEDs," LM3407 Data Sheet, Jan. 2008, Rev. May 2013, [retrieved on Dec. 9, 2016]. Retrieved from the Internet. <URL: http://www.ti.com/lit/ds/symlink/lm3407.pdf>.
Texas Instruments, "LM3405 1.6MHz, 1A Constant Current Buck Regulator for Powering LEDs," LM3405 Data Sheet, Oct. 2006, Rev. May 2013, [retrieved on Dec. 9, 2016]. Retrieved from the Internet. <URL: http://www.ti.com/lit/ds/symlink/lm3405.pdf>.
Texas Instruments, "LM3406 1.5-A, Constant Current, Buck Regulator for Driving High Power LEDs," LM3406, LM3406HV, LM3406HV-Q1 Data Sheet, Sep. 2008, Rev. Mar. 2014, [retrieved on Dec. 9, 2016]. Retrieved from the Internet. <URL: http://www.ti.com/lit/ds/symlink/lm3406.pdf>.
Texas Instruments, "LM3409, -Q1, LM3409HV, -Q1 P-FET Buck Controller for High-Power LED Drivers," LM3409, LM3409-Q1, LM3409HV, LM3409HV-Q1 Data Sheet, Mar. 2009, Rev. Jun. 2016, [retrieved on Dec. 9, 2016]. Retrieved from the Internet. <URL: http://www.ti.com/lit/ds/symlink/lm3409hv.pdf>.
Texas Instruments, "LM342x/-Q1 N-Channel Controllers for Constant-Current LED Drivers," LM3421, LM3421-Q1, LM3423, LM3423-Q1, Jul. 2008, Rev. Jul. 2015, [retrieved on Dec. 9, 2016]. Retrieved from the Internet. <URL: http://www.ti.com/lit/ds/symlink/lm3423.pdf>.
Texas Instruments, "LM3424/-Q1 Constant Current N-Channel Controller with Thermal Foldback for Driving LEDs," LM3424, LM3424-Q1, Aug. 2009, Rev. Aug. 2015, [retrieved on Dec. 9, 2016]. Retrieved from the Internet. <URL: http://www.ti.com/lit/ds/symlink/lm3424-q1.pdf>.
Texas Instruments, "LM3429/-Q1 N-Channel Controller for Constant Current LED Drivers," LM3429-Q1, Apr. 2009, Rev. Jul. 2015, [retrieved on Dec. 9, 2016]. Retrieved from the Internet. <URL: http://www.ti.com/lit/ds/symlink/lm3429-q1.pdf>.
Vlad Anghel, Christopher Bartholomeusz, Anca Gabriela Vasilica, Gheorghe Pristavu, and Gheorghe Brezeanu, "Variable Off-Time Control Loop for Current-Mode Floating Buck Conversters in LED

(56) References Cited

OTHER PUBLICATIONS

Driving Applications," IEEE Journal of Sold-State Circuits, pp. 1571-1579, vol. 49, No. 7, Jul. 2014, DOI: 10.1109/JSSC.2014.2320456.

Giovanni Capodivacca, Paolo Milanesi and Andrea Scenini, "Integrated Buck LED Driver With Application Specific Digital Architecture," IEEE, pp. 343-346, 2013, DOI: 10.1109/ESSCIRC.2013.6649143.

Zhidong Liu, Hoi Lee, "A 26 W 97%-Efficiency Fast-Settling Dimmable LED Driver With Dual-nMOS-Sensing Based Glitch-Tolerant Synchronous Current Control for High-Brightness Solid-State Lighting Applications," IEEE Journal of Solid-State Circuits, pp. 2174-2187, vol. 50, No. 9, 2015, DOI: 10.1109/JSSC.2015.2424375.

Chao-Hsuan Liu, Chun-Yu Hsieh, Yu-Chiao Hsieh, Ting-Jung Tai, and Ke-Horng Chen, "SAR-Controlled Adaptive Off-Time Technique Without Sensing Resistor for Achieving High Efficiency and Accuracy LED Lighting System," IEEE Transactions on Circuits and Systems-I: Regular Papers, pp. 1384-1394, vol. 57, No. 6, Jun. 2010, DOI: 10.1109/TCSI.2009.2028643.

In-Hwan Oh, "An Analysis of Current Accuracies in Peak and Hysteretic Current Controlled Power LED Drivers," IEEE, pp. 572-577, 2008, DOI: 10.1109/APEC.2008.4522778.

Dongkyung Park, Zhidong Liu, Hoi Lee "A 40 V 10 W 93%-Efficiency Current-Accuracy-Enhanced Dimmable LED Driver With Adaptive Timing Difference Compensation for Solid-State Lighting Applications," IEEE Journal of Solid-State Circuits, pp. 1848-1860, vol. 49, No. 8, Aug. 2014, DOI: 10.1109/JSSC.2014.2320951.

Sandip Uprety, Hai-Chen, and Dongsheng Ma, "Quasi-Hysteretic Floating Buck LED Driver with Adaptive Off-Time for Accurate Average Current Control in High Brightness Lighting," IEEE, pp. 2893-2896, 2011, DOI: 10-1109/ISCAS.2011.5938236.

\* cited by examiner

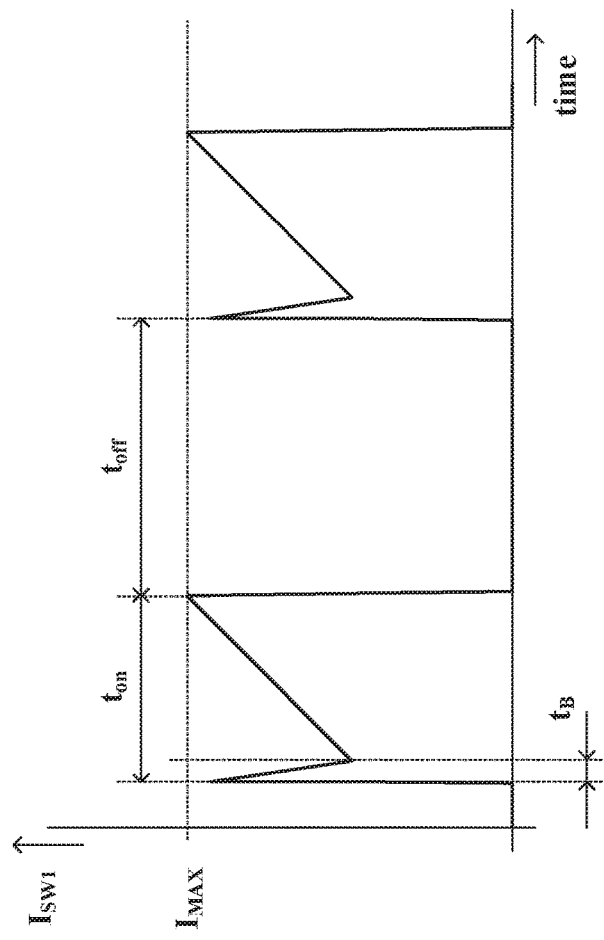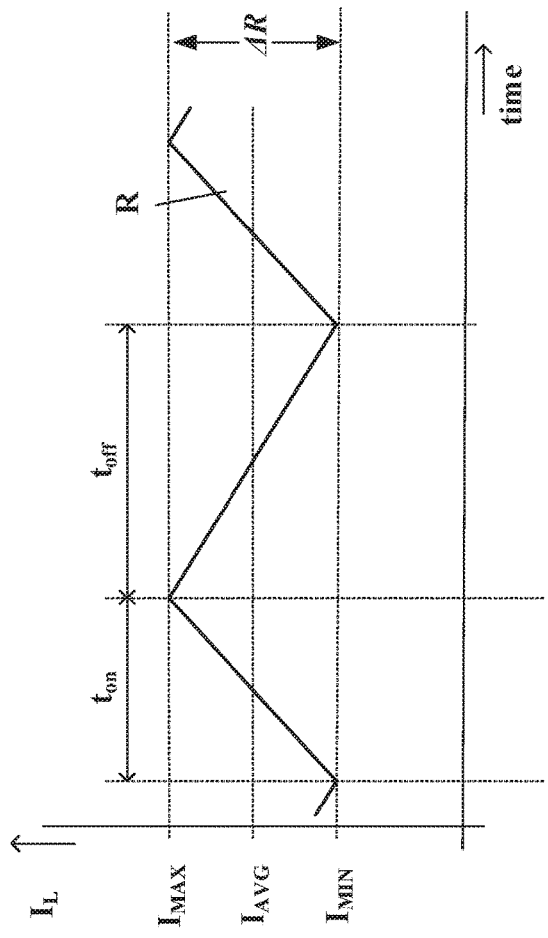
FIG. 2A (prior art)
FIG. 2B (prior art)

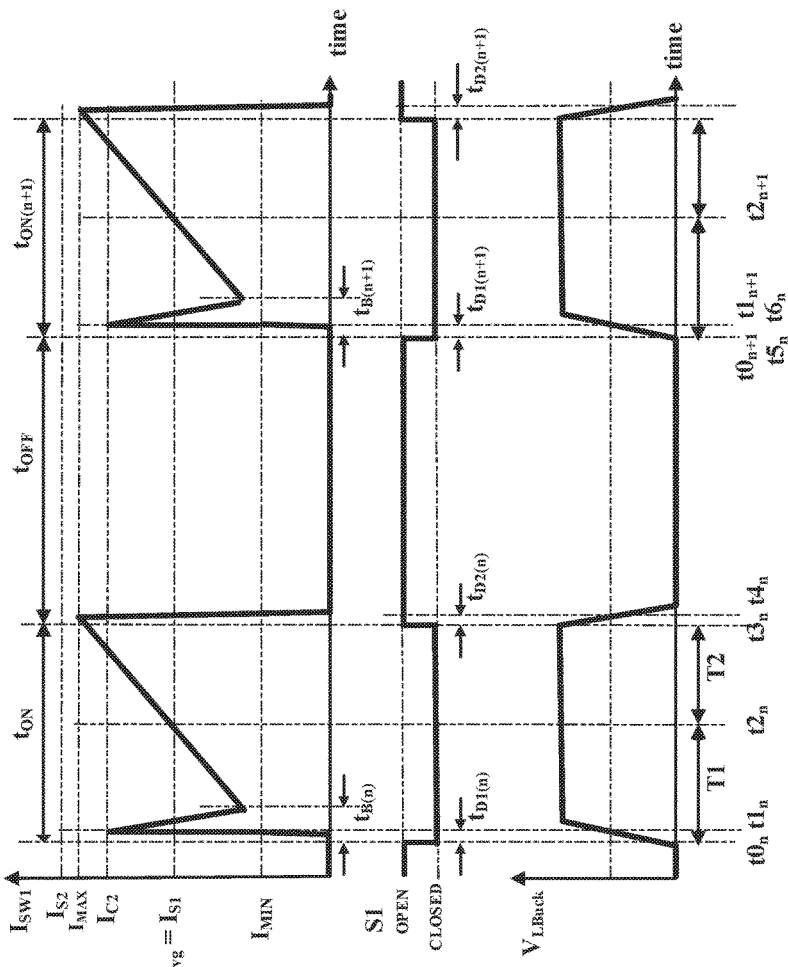

APPARATUS, SYSTEMS AND METHODS FOR AVERAGE CURRENT CONTROL IN A BUCK DC/DC LED DRIVER

CROSS-REFERENCE TO RELATED APPLICATIONS

The present application claims priority to U.S. Provisional Application Ser. No. 62/410,937 (the "'937 application"), entitled "Apparatus, Systems and Methods for Average Current and Frequency Control in a Synchronous Buck DC/DC LED Driver," which was filed by the present Applicant on Oct. 21, 2016 in the name of inventor Jean-Paul Eggermont, the entire contents of which are incorporated herein by reference.

TECHNICAL FIELD

The technology described herein generally relates apparatus, systems and methods for regulating currents produced by buck converters. The technology may find use in electronic devices, such as light-emitting-diode (LED) lighting applications and in other applications where control of the average currents used to drive LED units and similar types of loads is desired.

BACKGROUND

Today, LED lighting is gaining wide-spread acceptance in automotive, industrial and other lighting applications. As is commonly known and appreciated, LED lighting generally requires less energy to produce a desired quantity of light, where the quantity of light is often expressed in lumens and along a correlated color temperature range, often expressed in degrees Kelvin. In some LED applications, such as automobile front head-light applications, relatively high LED string voltages, often ranging between 4 to 50 Volts, and high currents, often ranging from 100 mAmps to 3 Amps, are commonly used. Such LED systems are commonly used to produce a range of Lumens over a given range at a color temperature in degrees Kelvin that is not noticeably perceptible by a driver. The quantity and temperature range of light produced, however, may vary based upon operating, user preference and other considerations. It is to be appreciated that the light produced by LED units is commonly proportional to the current used to drive the LED units. Given these voltage, current, lumen and temperature ranges, the regulation of the current flowing through the LEDs is very important.

As shown in FIG. 1, one common circuit 100 used today to regulate the current flowing through high power LED units utilize circuits that include a similar power source 102, connected to a DC/DC buck converter module 104. The buck converter module 104 commonly includes coils and capacitors which facilitate the storage and discharge of electrical energy, these inherent capabilities buck convertors are referred to herein as providing an energy storage module. Often the buck converter module 104 and related switching components are provided in a common ballast 106, but, may be provided separately or as components of larger systems or units. The principles of operation and elements of such buck converter module 104 are well known in the art and are not described herein but are incorporated herein by reference and by inherency. It is to be appreciated that one or more of the components of the buck converter module 104 shown in FIG. 1 may be replaced and/or augmented by other known circuit components and configurations. For example, diode 126 could be replaced by a N-type field effect transistor (FET) for a synchronous converter.

Further, it is to be appreciated that the electrical characteristics of one or more of the components of a buck converter module 104, as shown for example in FIG. 1, are illustrative only and can be considered to be elements of other components of the embodiments shown. As is commonly known, the output power, as commonly expressed in terms of an LED current $I_{LED}$ and an LED voltage $V_{LED}$, of the buck converter module 104 provides electrical power to one or more LED units 108a,b,c-108n. The LED units 108a,b,c-108n may be driven individually, collectively or some combination in-between by a pixel driver module 110 or a similar module (if any). The pixel driver module 110 may be used to control whether any given LED unit 108a-n is powered or short-circuited, at any given time, by selectively opening/closing irrespectively one or more pixel driver switches 112. Often the pixel driver module 110 adjusts the opening/closing of the one or more pixel driver switches 112 in accordance with then desired lighting conditions, as may be sensed, selected, or determined based upon ambient light sensors, speed, user preferences, in accordance with regulations and other considerations.

Often a first switch 116, such as an N-channel or P-channel MOSFET transistor, is used to control the operating state, "on" or "off", of the buck converter module 104. The peak current $I_{MAX}$ of the current $I_{LED}$ generated through the buck converter module 104 through switch 116, and thereby to the LED units 108a-n, may be sensed at the output of the buck converter module 104 using a current sensing element 117, for example, a resistive element 118 and an operational amplifier 120. If the optional filtering capacitor C1 124 is omitted, it is to be appreciated that the LED current $I_{LED}$ is the same as the coil current $I_L$. In other embodiments, other forms of current sensing devices and/or modules are often utilized. The voltage across the resistive element 118, as sensed by the operational amplifier, reflects the peak current $I_{MAX}$ provided to the LED units 108a-n at any given time. By controlling the respective "on" and "off" periods of the first switch 116, the currents $I_{LED}$ provided to the LED units 108a-n may be regulated. It is to be appreciated that when current sensing element 117 is placed series with LED units 108a-n, the real current flowing through the LED units 108a-n is sensed. In other embodiments, the current may be sensed at the first switch or otherwise. For such other embodiments, it is to be appreciated that the current sensed is not the real current provided to the LED units 108a-n due to the filtering effects of the capacitor C1 124. Capacitor C1 124 is often positioned on the LED side of coil 122 such that the current sensing element 117 is able to sense the instantaneous coil current. It is to be appreciated that current sensing element 117 is not an element of the buck converter module 104, As shown, buck converter module 104 commonly includes a coil 122 having an inductance L. In high current LED applications and in view of economic, design and other considerations, it is often desirable to reduce the inductance L of the coil 122 and eliminate the need for any external sensing elements such as resistive elements 118 which commonly drain too much power, are expensive, utilize too much physical space on electrical circuit boards and in view of other constraints.

Ideally, a low cost, low inductance system is needed which enables one to regulate the average currents provided to the LED units by the buck converter module 104. These competing desires of low cost, low inductance coils, exclusion of external sensing elements and others, while maintaining a desired average current and power provided to the LED units, with varying voltage demands of such LED units often are further constrained in that a reduction of the coil 122 inductance L often requires an increase in the frequency at which the first switch 116 is switched "on" and "off." It is to be appreciated that as the inductance L of coil 122 decreases, the switching frequency of the first switch 116 must increase in order to maintain a desired average current and acceptable ripple current provided to the LED units 108a-n.

Further constraining the above considerations and concerns is the need to avoid the generation of undesired electro-magnetic emissions during operation. It is commonly known that buck converters generate Electro-Magnetic Radiation (EMRs). High EMRs can influence the operations of other circuits and components in automobile and other implementations of high power LED units. Accordingly, the Electro-Magnetic Compatibility (EMC) of LED driver units is often highly regulated, especially in motor vehicles. Commonly, EMC concerns limit the permissible frequency range of buck converter modules to frequencies below 500 kHz or above 1.8 MHz and below 5.9 MHz. As such, today a need exists to regulate not only the average current but also the switching frequency of LED driver units.

As shown in FIGS. 2A and 2B, today's known circuits (such as the exemplary circuit shown in FIG. 1) commonly attempt to regulate high power LED modules by generating a ripple current R, where the ripple $\Delta R$ of the coil current, $I_L$ is controlled, over time, by the switching of the first switch 116 "on" and "off." These periods are shown in FIG. 2 by $t_{on}$ and $t_{off}$.

In FIGS. 2A and 2B, the "on" period for the first switch 116 is shown by $t_{on}$. The "off" period for the first switch 116 is shown by $t_{off}$, which is proportional to the voltage over the coil ($V_{LED}$-$V_{LC}$). That is, for these module designs, it is commonly appreciated that the time off period $t_{off}$ depends on the coil voltage during the "off" time, and is close to the voltage $V_{LED}$ of the LED units 108a-n, with the often negligible and disregarded differences arising from the forward voltage provided by the diode 126 during the "off" time. That is, as $V_{LED}$ increases, $t_{off}$ needs to decrease to maintain a constant current ripple $\Delta R$, and vice versa. This relationship can be expressed mathematically, where L is the value of the coil 122 of the buck converter 104, as follows:

$$(t_{off} \times V_{LED})/L = \Delta R.$$

It is to be appreciated that, per these prior art approaches, the switching frequency is not controlled, and is varying in response to variations in the input voltages $V_{IN}$ to the buck converter module 104, the properties of the coil 122, and the voltage needs $V_{LED}$ of the LED units 108a-n, where $V_{LED}$ may vary over time based upon the variations in the number of LED units on and off at any given time and the power needs of such LED units.

Further, it is to be appreciated that such designs require the inductance L of the coil 122 to be known and/or the system to be calibrated (and re-calibrated) to such inductance. The inductance of a coil may vary over time and in response to operating conditions. Variations in the inductance L may cause undesirable errors to arise in the output current $I_{LED}$.

Therefore, an apparatus, system, and method (collectively, "systems") is needed for a controlling the average current of a high-powered DCDC LED driver module. Such systems facilitate the use of low inductance coils, and buck converter modules which can operate, for a particular implementation, independent of a coil inductance, input voltage, and varying load conditions while maintaining the average current of the buck converter module. Further, systems are needed where current sensing occurs during the "on" time of the first switch and thereby limits power losses while improving system efficiency. Further, systems are needed which support asynchronous and synchronous operating modes, where, for example, asynchronous operations may occur when diode 126 is used with synchronous operations occurring when a MOSFET or similar transistor, instead of diode 126, is utilized.

SUMMARY

In accordance with at least one embodiment of the present disclosure, systems for powering an electrical load include a driver module and a regulating module. The driver module may include a buck converter module having at least one output node configured to provide electricity at an output voltage and at an output current. The driver module may also be configured to include a first switch that is configurable to operably couple a power source to the buck converter module during a time-on operating state occurring over a first time period of an operating cycle. The operating cycle may include a first, time-on operating state and a second, time-off operating state. The driver module may also be configured to include a current sensor module configurable to sense the electrical current provided to the buck converter module while the apparatus is operating in the first, time-on operating state. The regulating module may be operable to instruct and regulate the time periods during which the first switch is configured into at least one of the first, time-on operating state, and the second, time-off operating state such that the average current provided to the buck converter module is equal to a desired target current.

The system may be configured operate such that the time-on operating state occurs during each of a first period and a second period. Further, the first period may occur during a time interval arising from an initial time until a second time, wherein the initial time occurs when the first switch is configured into the time-on operating state and the second time occurs when a first sensed current is detected by the current sensor module.

The system may be configured to operate such that the first sensed current is detected by the current sensor module when the electrical current provided to the buck converter module reaches a target current.

The system may be configured to operate such that the second period occurs during a time interval arising from the second time until a third time, wherein the third time occurs when a second sensed current is detected by the current sensor module. Likewise, the current sensor module may be configured to detect when a first sensed current through the first switch during the time-on operating state equals a target current and upon such detection output a first comparison signal. The system may also be configured so that the current sensor module is configured to detect when a second sensed current through the first switch during the time-on operating state equals a desired maximum current threshold and, upon such detection, output a second comparison signal.

In accordance with at least one embodiment, the system may be configured include a regulating module having a control module that is coupled to a current sensor module and configured to receive a second comparison signal. Further, the control module may be coupled to a first switch and configured to output a switch signal to the first switch which sets the operating state of the first switch into a closed switch state. Further, a time-off module may be coupled to the output node of a buck converter module and configured to receive the output voltage produced by the buck converter module. Per at least one embodiment, the time-off module may be configured to detect a decrease in the output voltage during a transitioning of the first switch from the time-on operating state to the time-off operating state and upon detecting such decrease in the output voltage output a time-off signal to the control module.

In accordance with at least one embodiment, a system may include a compare module coupled to the current sensor module and to the control module and, where the compare module may be configured to receive a switch signal, a first comparison signal and a second comparison signal and, based on when the switch signal, first comparison signal and second comparison signal are each received, determine an initial event time, a second event time and a third event time. The compare module may also be configured to calculate a first period based on an amount of time elapsed between the initial event time and the second event time, calculate a second period based on an amount of time elapsed between the second event time and the third event time, and compare the first period to the second period. Based on the comparison of the first period to the second periods the compare module may output a difference signal.

In accordance with at least one embodiment, the system may include adjust module. The adjust module may be coupled to and configured to receive signals from a compare module. The adjust module may be coupled to and configured to output signals to a current sensor module. Further, upon receipt of a difference signal from a compare module, the adjust module may be configured to determine an amount of adjustment needed to a desired maximum current threshold and output an adjust signal to a current sensor module.

In accordance with at least one embodiment, the system may include a timer module. The timer module may be coupled to a current sensor module. The timer module may be coupled to a control module. The timer module may be configured to receive a switch signal and a first comparison signal and, based on the received signals, output a measured time signal to the control module.

In accordance with at least one embodiment, a system may be configured to operate such that a first, time-on operating state occurs during a first period and a second period, a measured time signal indicates a duration of the first period for a current cycle of the buck converter module, a timer module adjusts the length of the second period to be equal to the first period and, when the adjusted second period ends, the timer module outputs a measured time signal. The system may also be configured to operate such that upon receipt of the measured time signal, the control module stops outputting the switch signal and the time-off operating state of the buck converter module begins.

In accordance with at least one embodiment, the system may be configured to include a voltage comparator module configured to measure input voltages provided to a buck converter module. The voltage comparator module may be coupled to and configured to output to a regulating module a comparison signal indicative of a period of delay in the input voltages provided to the buck converter module. The comparison signal may indicate a turn-on delay and/or a turn-off delay.

In accordance with at least one embodiment, a system for determining when currents generated by a buck converter module reach at least two current thresholds, may include a first current source coupled to a power source providing electricity at a first voltage and configured to output a first current; a first compare switch coupled to the first current source and to the first circuit junction and configured to respond to a first control signal; a first compare capacitor having a first capacitance and coupled to the first circuit junction; a first discharge switch coupled to the first circuit junction and configured to respond to a third control signal; a second current source coupled to the power source and configured to output a second current; wherein the second current source is coupled to a second circuit junction; a second compare capacitor having a second capacitance and coupled to the second circuit junction; a second discharge switch coupled to the second circuit junction and configured to respond to the third control signal; a comparator coupled to the first circuit junction, the second circuit junction and to a comparison lead; wherein the first current is two times the second current and the first capacitance equals the second capacitance; wherein the first control signal comprises a first comparison signal received from a current sensor module utilized to control the operating states of a buck converter module; wherein upon receipt of the first control signal, the first compare switch is configured to change from a closed state to an open state; wherein the third control signal comprises a switch signal received from a control module utilized to control the operating state of the buck converter module; wherein upon receipt of the third control signal, each of the first discharge switch and the second discharge switch are configured to change from an open state to a closed state; wherein the buck converter module operates over at least one duty cycle comprising an time-on period and a time-off period; wherein the time-on period comprises a first period and a second period; wherein the first period occurs from an initial event time to a second event time and the second period occurs from the second event time to a third event time; wherein the first control signal is received by the first compare switch when the second event time occurs; wherein the third control signal is present during the time-on period; wherein a second compare switch couples the second current source to the second circuit junction; wherein the second compare switch is configured to respond to a second comparison signal received from the current sensor module; and wherein upon receipt of the second comparison signal, the second compare switch is configured to change from a closed state to an open state.

In accordance with at least one embodiment, a system for or powering an electrical load, may include a buck converter module comprising at least one output node configured to provide electricity at an output voltage and at an output current. The system may further include a first switch configured to operably couple a power source to the buck converter module during a time-on operating state occurring over a first time period of an operating cycle. The operating cycle may include a time-on operating state and a time-off operating state.

The system may further include a current sensor module configured to sense the electrical current provided to a buck converter module during a time-on operating state.

The system may further include a regulating module operable to instruct and regulate the time periods during which a first switch is configured into at least one of a time-on operating state and a time-off operating state such that an average current provided to a buck converter module is equal to a desired target current.

The system may further include a regulating module having a switch control module configured to control the time-one operating state such that a first time period equals a second time period during each operating cycle of a buck converter module.

In accordance with at least one embodiment, a system may include a regulating module that includes a timer module coupled to a current sensor module and to a switch control module. The timer module may be configured to receive a first comparison signal from the current sensor module, and a difference signal, wherein the difference signal indicates a difference arising between an input voltage provided to a buck converter module and an output voltage generated by the buck converter module during a time-on operating state of a given operating cycle. The timer module may be configured to output an off signal to the switch control module, wherein the off signal instructs the switch control module to transition the first switch from a closed state to an open state. The system may be further configured to include a second timer module coupled to the switch control module. The second timer module may be configured to receive a load voltage signal and a switch signal. The switch signal may be received from the switch control module. The second timer module may be configured to output an on signal to the switch control module, wherein the on signal instructs the switch control module to transition the first switch from an open state to a closed state. The timer module may also be configured to receive a first set signal.

BRIEF DESCRIPTION OF THE DRAWINGS

The features, aspects, advantages, functions, modules and components of the apparatus, systems and methods provided by the various embodiments of the present disclosure are further disclosed herein with regard to at least one of the following descriptions and accompanying drawing figures.

FIG. 2A illustrates the first switch currents commonly generated over time during operation of the prior art buck converter of FIG. 1.

FIG. 2B illustrates the resulting coil ripple currents commonly produced in conjunction with the use of the prior art approach of FIG. 1.

FIG. 4A illustrates the first switch currents of a driver module used in accordance with at least one embodiment of the present disclosure.

FIG. 4B illustrates the operating states of a first switch used in accordance with at least one embodiment of the present disclosure.

FIG. 4C illustrates the voltages on the output of the first switch provided over time in accordance with at least one embodiment of the present disclosure.

DETAILED DESCRIPTION

Figure 1:
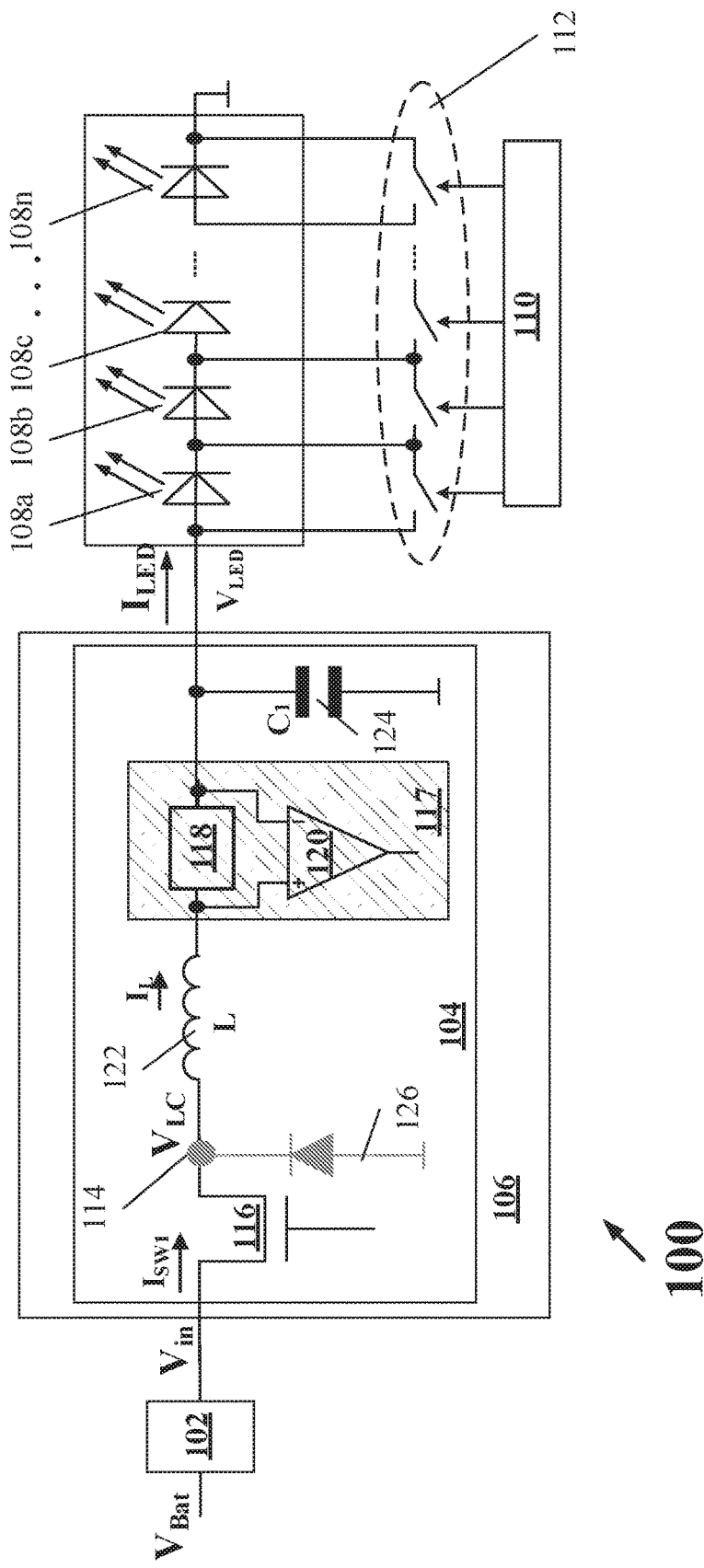
FIG. 1 is schematic representation of a prior art approach to regulating the operation of buck converters driving LED units.

The various embodiments described herein are directed to apparatus, systems and methods by which the average current of a direct current (DC) to DC buck converter module may be regulated. While the various embodiments set forth herein, and as shown in the attached drawing figures, provide sufficient information for a person of ordinary skill in the art to practice one or more of the inventions, as claimed herein or as later claimed in any application claiming priority to this disclosure, it is to be appreciated that one or more embodiments may be practiced without one or more of the details provided herein. As such, the various embodiments described herein are provided by way of example and are not intended and should not be used to limit the scope of any invention claimed to any embodiment.

It is to be appreciated that in accordance with at least one embodiment of the present disclosure, systems are described which facilitate the sensing and regulation of a real average current provided to one more loads, such as one or more LED units, by a buck converter module. Likewise, one or more of the various embodiments discussed herein eliminate any need that exist in prior art systems for sensing inductor currents. Instead, currents are sensed during the "on" time of a first switch 116 of a buck converter module 104. It is to be appreciated, that such an approach reduces power dissipations while improving system efficiency. Further, per at least one embodiment, a blank time $T_B$ (see FIG. 2) that commonly arises when a first switch 116 transitions from an "off" state to an "on" state may be disregarded and does not influence the operational accuracy of average current regulation. It is also to be appreciated, that at least one embodiment of the present disclosure facilitates modes of operation based on, for example, fixed frequencies, fixed current ripples or otherwise, such as where desired operating frequencies may vary over time based on one more then arising operating conditions. Likewise, at least one embodiment facilitates fast regulation of average currents and/or frequencies produced by a buck converter module. Such capabilities may be desirable and/or suitable, for example, for use with pixel driver modules and pixel lighting applications. It is also to be appreciated that at least one embodiment eliminates a need for a compensation circuit. While compensation circuits may be utilized in conjunction with one or more embodiments of the present disclosure, unlike many prior art approaches, such compensation circuits are not needed or required. Similarly, it is to be appreciated that per at least one embodiment of the present disclosure, average currents and/or frequencies may compensate for errors, such as tolerance errors, arising in or in conjunction with the use of one or more external components, such as inductors and capacitors, and/or from input and/or output signal variances, such as those arising in $V_{BAT}$, $V_{in}$, $V_{LED}$ or otherwise.

Figure 3:
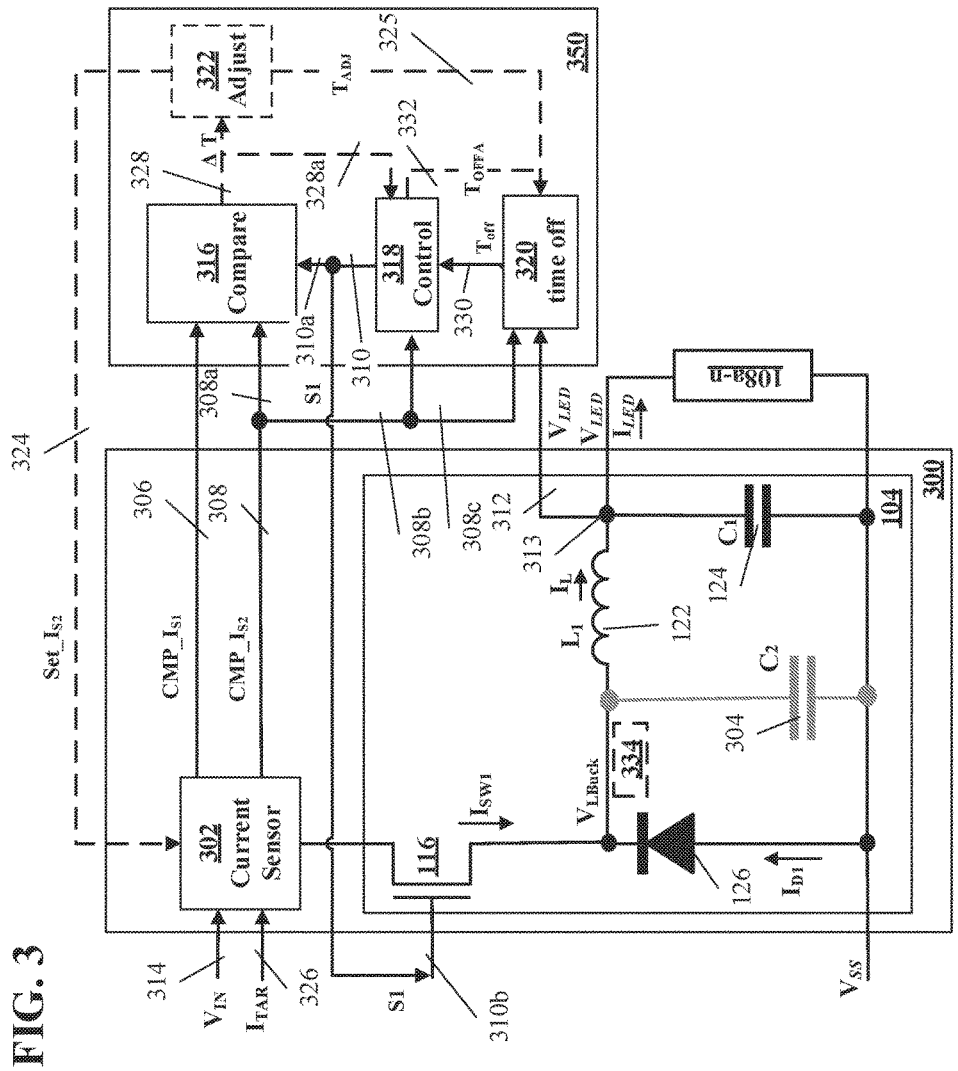
FIG. 3 is a schematic diagram of a system including a driver module and a regulating module for use in accordance with at least one embodiment of the present disclosure.

As shown in FIG. 3 and for at least one embodiment of the present disclosure, a driver module 300 is provided for sensing and regulating the current, $I_{LED}$, provided to one or more LED units 108a-n. Driver module 300 may include a DCDC buck converter module 104, a first switch 116 and a current sensor module 302.

It is to be appreciated, that current $I_{LED}$ will vary over time and is the same as the current produced by buck converter module 104 at any given time. Buck converter module 104 includes a coil 122 having an inductance $L_1$, an optional capacitor 124 having a capacitance $C_1$, and at least one switch 116 and one diode 126. It is to be appreciated that for at least one embodiment of the present disclosure, capacitor 124 may be utilized to decrease current ripple, peak current through the LEDs and decrease EMC radiations. For at least one embodiment, the sensing and regulating of current $I_{LED}$ is independent of the inductance and capacitances used for any given implementation. The inductance and capacitance values being used for the buck converter module 104 may be selected by a person of ordinary skill in the art based upon well-known electrical circuit design principles which are incorporated herein by reference and by inherency.

Driver module 300 may be configured such that the first switch 116 is used to control the "on" and "off" cycles of buck converter module 104. In accordance with at least one embodiment, first switch 116 may be a MOSFET transistor. In FIG. 3, element 304 represents the parasitic capacitance of diode 126. In accordance with at least one embodiment, additional capacitance may be added in parallel to diode 126 in order to, for example, limit the speed at which $V_{LBuck}$ decreases when the first switch 116 is "off." It is to be appreciated that in accordance with other embodiments, other type of components may be used in lieu of diode 126 such as another transistor. The first switch current $I_{SW1}$ is the current through the first switch 116 and the diode current $I_{D1}$ is the current through the diode 126. The first switch current $I_{SW1}$ and the diode current $I_{D1}$ arise during the respective "on" and "off" periods of the buck converter module 104. A current sensor module 302 may be used to monitor the first switch current $I_{SW1}$. Any known devices, modules, techniques or otherwise may be used to monitor the first switch current $I_{SW1}$ during the "on" state of operation of the driver module 300. One example of such known current sensing devices is a sensing resistor. Further, it is to be appreciated that internal current sensing on the first switch 116 may be used in one or more embodiments of the present disclosure.

As further shown in FIG. 3 and in FIG. 4 in accordance with at least one embodiment, driver module 300 may be coupled, to regulating module 350 via at least four leads, including a first comparison lead 306, a second comparison lead 308, a switch control lead 310, a $V_{LED}$ lead 312, and an optional adjust lead 324. It is to be appreciated that a "lead" may be any device, system, component or otherwise existing physically, logically or otherwise which facilitates the communication of one or more real or virtual signals from one system device, component or process to another. For example, as shown herein with respect to at least one or more embodiments of the present disclosure, leads may be considered to be electrical wires, data busses, pathways on printed circuit boards, integrated circuit pathways or otherwise. In accordance with at least one embodiment, first comparison lead 306 and second comparison lead 308 may be combined into a single comparison lead (not shown). Second comparison lead 308 includes two branches, 308a and 308b. The first and second comparison leads 306 and 308 may be used to respectively output, by current sensor module 302 to time comparison module 316 and to control module 318, a first comparison signal "CMP_$I_{S1}$" and a second comparison signal "CMP_$I_{S2}$". The switch control lead 310 may be used to communicate a switch signal $S_1$ from control module 318 to the first switch 116 where switch signal $S_1$ controls the "open" and "closed" states of the first switch 116. The $V_{LED}$ lead 312 may be coupled to an output node 313 of the buck converter module 104 and used to provide the output voltage $V_{LED}$ to time off module 320. The optional adjust lead 324 may be used to provide an adjust signal "Set_$I_{S2}$" to current sensor module 302. The adjust signal Set_$I_{S2}$, when present, may be used to adjust the level of $I_{S2}$. It is to be appreciated that Power lead 314 provides electrical power from a power source (not shown) to the driver module 300 for use in powering the LED units. It is to be appreciated that other power sources may be utilized in conjunction with one or more digital or analog embodiments of the regulating module 350 to power the components used. A target average current signal "$I_{TAR}$" may be provided to current sensor module 302 via target current lead 326.

As further shown for at least the embodiment illustrated in FIG. 3, driver module 300 receives power $V_{in}$ from a source 102 (not shown in FIG. 3) or another power source. It is to be appreciated that driver module 300 may receive power from any source configured to provide the desired voltage or voltage ranges. Such power sources are well-known in the art and are incorporated herein by reference and inherency. In accordance with at least one embodiment of the present disclosure, $V_{in}$=12 volts DC and $V_{LED}$=10 volts DC may be possible values.

The principles of operation of driver module 300 are described with reference to FIGS. 4A, 4B and 4C, where FIG. 4A shows the characteristics of current $I_{SW1}$. It is to be appreciated that $I_{SW1} \approx I_{LED}$ when first switch 116 is "closed" and at all other times is equal to zero (disregarding any trickle currents that might otherwise arise). It is to be appreciated that during the blank time $t_{B(n)}$, higher currents flow through switch 116 due to the charging of capacitor C2 304. As further shown in FIG. 4A, a delay time $t_{D1(n)}$ may arise from a falling edge on the S1 signal 310 to the moment when $V_{LBuck}$ crosses the $V_{LED}$ voltage. This delay time may rise due to a delay of the predriver and the first switch S1. Blank time $t_{B(n)}$ starts with the falling edge on S1 signal and ends when the first switch 116 is switched "on" and when the $V_{LBuck}$ voltage is close to the $V_{IN}$ voltage. Commonly, $t_{B(n)}$ is longer than $t_{D1(n)}$. It is to be appreciated that when optional capacitor 124 is present in a given embodiment of the present disclosure, the ripple R of the LED current $I_{LED}$ will generally be smaller than a comparable circuit where capacitor 124 is not present. Such variations in actual currents, arising from the presence or absence of capacitor 124, are well understood by a person of ordinary skill in the art and are not discussed further herein. FIG. 4B shows the toggling of first switch 116 between and "off" state (when first switch 116 is "open") and an "on" state (when first switch 116 is "closed"). FIG. 4C shows the resulting changes in the voltage $V_{LBuck}$.

In FIGS. 4A, 4B and 4C, those periods when the buck converter module 104 is considered "on" and "off" are respectively shown as periods $t_{ON}$ and $t_{OFF}$. In accordance with the present naming convention, $t_{ON}$ represents the combined periods from $t0_n$ to $t3_n$ and $t_{OFF}$ represents the period $t3_n$ to $t0_{n+1}$ where "n" is an integer and represents a given cycle of operation of the buck converter module, where a single cycle includes the periods from $t0_n$ through $t0_{n+1}$ which arise from when the buck converter module is switched into an "on" state, then to an "off" state and then to immediately prior to it returning to an "on" state.

More specifically, when the first switch 116 is "closed", the buck converter module 104 is in the "on" state. Contrarily, $t_{OFF}$ occurs when first switch 116 is open. In accordance with at least one embodiment, some delay may occur during a transition from a previous "off" state to an "on" state and vice versa. These delays are respectively shown in FIGS. 4A-4C by $t_{D1(n)}$ and $t_{D2(n)}$. For purposes of this disclosure, such delays, when arising in the Nano-Second range of 1 ηSec. to 10 ηSec. are insubstantial, such that for all practical purposes the switching "on" and "off" (and the inverse operations thereof) of the first switch 116 and of the buck converter module 104 is considered to occur substantially instantaneously.

In at least one embodiment, time $t3_n$, which as shown in FIG. 4A is the beginning of the $t_{OFF}$ period, is determined to occur when the sensed switch current $I_{SW1}$ reaches a maximum current in the coil of $I_{MAX}$. When a desired $I_{MAX}$ current is sensed, the first switch 116 is transitioned from a "closed"/"on" state to an "open"/"off" state, which in accordance with at least one embodiment occurs after insubstantial delay $t_{D2}$.

It is to be appreciated that by adjusting the values of $I_{MAX}$ and $I_{MIN}$ the first and second periods, T1, and T2 respectively, may be obtained. By corollary, by adjusting when times $t0_n/t5_{n-1}$ and $t3_n$ occur and thereby when the first switch 116 transitions from "open" state to "closed" state the value of $I_{MAX}$ and $I_{MIN}$ may be adjusted. Further, by adjusting the periods T1 and T2 and thereby the values $I_{MAX}$ and $I_{MIN}$, symmetry of $I_{MAX}$ and $I_{MIN}$ relative to a desired target current $I_{TAR}$ may occur. In an optimal operating state the resulting average current $I_{AVG}=I_{S1}=I_{TAR}$, where the target current $I_{TAR}$ is the desired operating current for the LED units 108a-n and $I_{S1}$ is defined as the "first sensed current"—as sensed by current sensor module 302. In accordance with at least one embodiment the desired target current is an input value provided to the current sensor module 302 via target current lead 326. It is to be appreciated that $I_{TAR}$ may be pre-determined, specified in advance, determined experimentally, calibrated once or repeatedly, or may be otherwise identified for use in accordance with a given one or more LED units 108a-n. It is to be further appreciated that the value of $I_{TAR}$ may vary in accordance with the principles of operations used in conjunction with a given (if any) pixel driver module 110 used in conjunction with one or more embodiments of the present disclosure.

In accordance with at least one embodiment, the average output current $I_{AVG}$ may be calculated for any given duty cycle, as follows:

$$I_{AVG} = I_{S2} - \frac{(I_{S2} - I_{S1})}{2} * \frac{(T1 + T2)}{T2} \qquad \text{Equation 1}$$

Accordingly, it is to be appreciated that a determination of whether the average output current is above or below the desired target current $I_{TAR}$ can be made by comparing the T1 and T2 periods. For at least one embodiment, $I_{S1}=I_{AVG}=I_{TAR}$ when the T1 period has the same duration as the T2 period. In accordance with at least one embodiment, T1=T2. It is to be appreciated, however, that the average current can be calculated when T1≠T2 and the operation of the buck converter module 104 adjusted by adjusting the maximum current $I_{MAX}$ for the next cycle of the buck converter module 104, where increasing/decreasing the value of $I_{MAX}=I_{S2}$ results in a corresponding increase/decrease (as per Equation 1) in the value of $I_{AVG}$. Again, the value of $I_{MAX}$ can be adjusted by changing when time $t3_n$ occurs. As shown in FIG. 4A-4C, time $t3_n$ occurs when $I_{S2}$ is detected. Accordingly, and for at least one embodiment, the current sensor module 302 is configured to detect when $I_{SW1}=I_{S1}$ and when $I_{SW1}=I_{S2}$.

It is to be further appreciated that for at least one embodiment, the frequency of the LED current $I_{LED}$ produced by the buck converter module 104 may also be adjusted from one cycle to the next based on the sensed currents $I_{S1}$ and $I_{S2}$. Specifically, by adjusting when $I_{S2}$ is reached for a then present duty cycle (which as per above can be adjusted by shortening or lengthening period T2) the duration of $t_{OFF}$ and thereby the frequency of the LED current $I_{LED}$ can be adjusted. It is to be appreciated that as $t_{OFF}$ increases the frequency of the LED current $I_{LED}$ decreases and vice versa.

As shown in FIGS. 4A, 4B and 4C for at least one embodiment of the present disclosure, period $t_{D1(n)}$ represents the period $t0_n$ to $t1_n$ during which the parasitic and/or additional capacitance C2 of the buck converter module 304 is charged. As discussed above, such parasitic capacitance, as represented by element 304, may arise, for example, in association with the activation of the first switch 116, or otherwise. As shown, during the charging of any additional capacitance C2, current $I_{SW1}$ through first switch 116 initially has a peak current $I_{C2}$. For at least one embodiment, current $I_{SW1}$ sensed during blank time $t_{B(n)}$ may be masked and is not used to regulate the average current provided by driver module 300 to LED units 108a-n. After blank time $t_{B(n)}$ current $I_{SW1}$ may be sensed and generally increases from a value $I_{MIN}$ to the maximum current $I_{MAX}$ provided by driver module 300 to the LED units 108a-n. Accordingly, and for at least one embodiment, the currents $I_{S1}$ and $I_{S2}$ are sensed by the current sensor module 302 and are provided to the regulating module 350 for use in regulating the operation of driver module 300.

As shown in FIG. 3, current sensor module 302 measures the current in first switch 116. In accordance with at least one embodiment, internal current sensing on the switch transistor itself may be used. In other embodiments, a sensing resistor or other known technique may be used. The target LED current $I_{TAR}$ is provided to the current sensor module 302. As discussed above, $I_{TAR}$ represents the target average output current for the LED units. Current sensor module 302 monitors the $I_{SW1}$ current and when it equals the pre-set $I_{TAR}$ current level, outputs the CMP_$I_{S1}$ set signal on first comparison lead 306.

The adjust signal, Set_$I_{S2}$, represents the desired maximum current $I_{S2}$ in the coil 122. Set_$I_{S2}$ is provided by the adjust module 322 to the current sensor module 302 by adjust lead 324. Current sensor module 302 monitors the $I_{SW1}$ current and when it equals the pre-set Set_$I_{S2}$ current level, outputs the CMP_$I_{S2}$ set signal on second comparison lead 308.

Compare module 316 monitors the first comparison lead 306 and second comparison lead 308 for the providing of the respective set signals, CMP_$I_{S1}$ and CMP_$I_{S2}$, by the current sensor module 302. Compare module 316 also monitors switch control lead 310, via branch 310a, for the occurrence of switch signal S1 which, while present, closes first switch 116. Based on signals CMP_$I_{S1}$, and S1, compare module 316 determines when times t0$_n$ and t2$_n$ occur—such events indicating the respective start and end times of period T1 for a given cycle of the buck converter. And, based on when signal CMP_$I_{S2}$ is received, compare module 316 further determines when event t3$_n$ occurs—with events t2$_n$ and t3$_n$ indicating the respective start and end times of period T2. Based on these indications a determination is made as to which period T1 or T2 is longer (if they are not equal) and the amount of any differences between periods T1 and T2. Compare module 316 outputs an (optional) difference signal ΔT indicative of the differences between periods T1 and T2 when (optional) adjust module 322 is provided for a given embodiment. If an adjust module 322 is not provided in a given embodiment, the compare module 316 is additionally configured to output the difference signal ΔT to the control module 318 via lead 328a. In at least one embodiment of the present disclosure, it is to be appreciated that compare module 316 may be configured to additionally, separately, or otherwise determine the difference, if any, between the compare signals. These differences, if any, may be expressed in difference signal ΔT as having a given polarity, where a first polarity may indicate when the average current is higher than the set target average current and a second polarity may indicate when the average current is lower than the set target average current. The compare module 316 may be configured to report such difference signal ΔT to the control module 318.

In accordance with at least one embodiment, adjust module 322 may be configured to provide a $T_{ADJ}$ adjustment signal to time off module 320 via second adjust signal lead 325. That is, it is to be appreciated that in accordance with one or more embodiments, adjust module 322 may be configured to adjust the $I_{S2}$ current, when $T_{ADJ}$ occurs and/or both.

Per at least one embodiment, upon receipt of difference signal ΔT, adjust module 322 adjusts the value of adjust signal Set_$I_{S2}$ to correspondingly increase or decrease the value desired for the maximum LED current $I_{MAX}$ provided by the buck converter module 104 to the LED units 108a-n. As discussed above, by increasing or decreasing the value of $I_{MAX}$, periods T1 and T2 may be adjusted as wells as the cycling frequency for the buck converter module 104, as controlled by the corresponding opening and closing of the first switch 116. In accordance with at least one embodiment of the present disclosure, adjust module 322 may be implemented as an up/down counter which incrementally adjusts the value of the Set_$I_{S2}$ signal. In accordance with at least one embodiment, the amount of incrementing from one cycle to another may include a set change of 5 milliamps. It is to be appreciated that any value may be utilized and the step amount may vary based on design considerations such as whether the step is linear or non-linear, based on set or variable output currents or otherwise as desired for any given implementation of one or more of the various embodiments of the present disclosure. In other embodiments, where larger increments are possible or anticipated, adjust module may include any number of counters, or other known, components in order to provide the fidelity and responsiveness required for any given implementation of one or more of the embodiments of the present disclosure.

As further shown in FIG. 3, control module 318 is configured to receive the CMP_$I_{S2}$ signal and a time-off signal $T_{off}$ via $T_{off}$ lead 330, from time off module 320. Time off module 320 may be configured to receive and monitor the LED voltage, $V_{LED}$, provided by the buck convertor module 104 to the LED units 108a-n. $T_{off}$ signal is generated by time off module 320 when event time t3$_n$ occurs as indicated by CMP_$I_{S2}$ signal and communicated to time off module 320 via lead 308c. $T_{off}$ signal is communicated via lead 330 to control module 318. At time t3$_n$, control module 318 terminates the sending of switch signal S1 to the first switch 116. As shown in FIG. 4C for at least one embodiment, $V_{LBuck}$ decreases quickly upon the opening of the first switch 116 and may drop by at least 50% by the end of the transient delay period $t_{D2(n)}$. As further shown in FIG. 3, control module 318 may also be configured to provide a $T_{OFF}$ adjustment signal $T_{OFFA}$ to time off module 320 via optional control lead 332. $T_{OFFA}$ may be used by time off module 320 to adjust when a $T_{off}$ condition is detected and thereby increase or decrease the average current $I_{AVG}$.

As further shown in FIGS. 3 and 4A-4C and as discussed above, during the transition of the first switch 116 from an "open" to "closed" state a first delay $t_{D1(n)}$ may occur. Likewise, during the transition of the first switch 116 from the "closed" state to an "open" state a second delay $t_{D2(n)}$ may occur. As shown, T1 includes delay for switch activation, while T2 does not include delay for switch deactivation. It is to be appreciated that this dichotomy may induce some error in the average output current. In accordance with at least one embodiment, these delays may be compensated by including a third voltage comparator 334 which monitors the output voltage $V_{LBuck}$ of the first switch 116 in the buck converter module 104. Per such an embodiment, period $T1^2$ is compensated based on the measurements of $V_{LBuck}$ and occurs from time t1$_n$ to t2$_n$ and period $T2^2$ occurs from time t2$_n$ to t4$_n$. FIGS. 4D-4G represent the currents and voltages provided to the coil 122 and as sensed by an optional buck voltage comparator in accordance with at least one such embodiment of the present disclosure. For at least this embodiment, the third voltage comparator 334 may provide a third comparison signal $CMP_3$ via a lead (not shown) to the time off module 320. The $CMP_3$ signal may be used to trigger the time off generator module 320 in lieu of and/or in addition to using the CMP_$I_{S2}$ signal.

Figure 5:
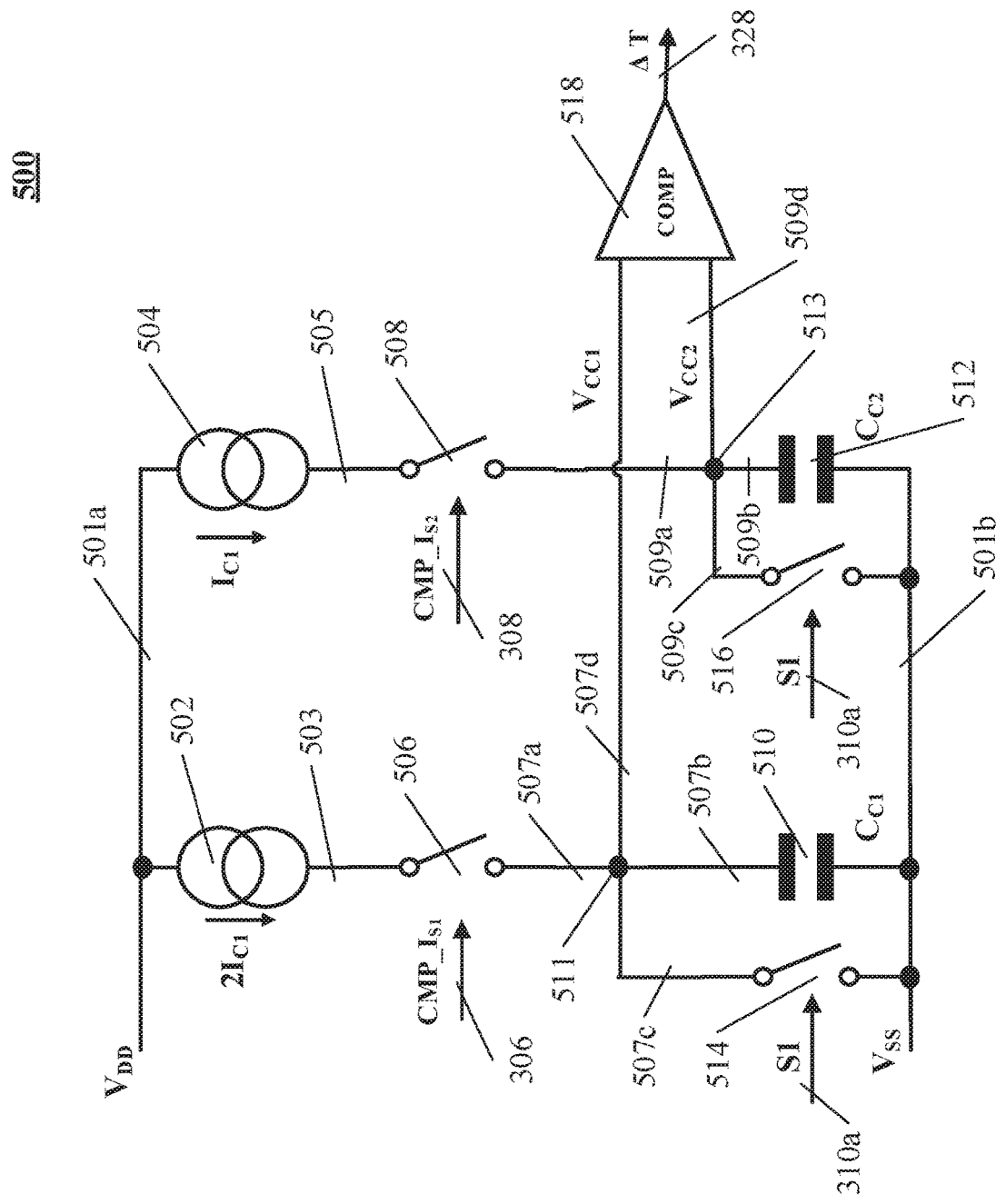
FIG. 5 is a schematic diagram of a compare module used in accordance with at least the embodiment of FIG. 3 of the present disclosure.

Referring now to FIG. 5 and with respect to at least one embodiment of the present disclosure, an embodiment of a compare module 500 is shown. As shown, compare module 500 is connected to source providing power at a voltage $V_{DD}$ by source lead 501a. The circuit is also coupled to a ground or other connection at a voltage potential of $V_{SS}$ by ground lead 501b. A set of first and second current sources 502 and 504, respectively, convert the power provided by the power source into two currents, where the second current source outputs a current $I_{C1}$ and the first current source outputs a current which can be, for example, 2 times $I_{C1}$ (hereafter, the $2I_{C1}$ current). It is to be appreciated that the value of currents $I_{C1}$ and $2I_{C1}$ may be set to any desired value with the capacitance of first and second compare capacitors $C_{C1}$ and $C_{C2}$, 510 and 512 respectively, scaled accordingly. More specifically, the first compare capacitor 510 and the second compare capacitor 512 may be of any suitable capacitance and for at least one embodiment have the same capacitances $C_{C1}$ and $C_{C2}$. The capacitances suitable for an implementation of any given embodiment of a compare module in accordance with the present disclosure is well known in the art and is not described herein. A set of first and second compare switches, 506 and 508 respectively, are coupled to the first and second current sources, 502 and 504 respectively, by respective first and second source leads 503 and 505. The first compare switch 506 is controlled by the COMP_$I_{S1}$ signal which is provided by the current sensor module 302 via the first comparison lead 306. The second compare switch 508 is controlled by the COMP_$I_{S2}$ signal which is provided by the current sensor module 302 via the second comparison lead 308. The first compare switch 506 is coupled to a first compare capacitor 510 by first compare switch leads 507a and 507b. The second compare switch 508 is coupled to a second compare capacitor 512 by second compare switch leads 509a and 509b.

As further shown in FIG. 5, a first discharge switch 514 and a second discharge switch 516 are respectively coupled, in parallel, to each of the first compare capacitor 510 and the second compare capacitor 512 by respective first and second compare switch leads 507c and 509c. The first and second discharge switches 514 and 516 respectively control the charging and discharging of the first and second compare capacitors 510 and 512 based on the presence or absence, as the case may be, of switch signal S1 on the switch control lead 310a. As discussed above, switch signal S1 is "set" (low, for the embodiment shown in FIG. 4B) when the first switch 116 is closed and the buck converter module is in an "on" state. It is to be appreciated that the relative "low" or "high" conditions of any signal, including for example signal S1, and the meaning or import associated therewith are a matter of convention and system designer choice and the various embodiments of the present disclosure are intended to not be limited to any particular signal level as representing any particular operating state or condition of any of such embodiments.

As further shown in FIG. 5, second compare switch lead 507c at first circuit junction 511 couples the first compare switch 506, the first compare capacitor 510 and the first discharge switch 514 to a first input of a comparator 518. A first compare switch lead 509c at second circuit junction 513 couples the second compare switch 508, the second compare capacitor 512 and the second discharge switch 516 to a second input of comparator 518. The comparator 518 is coupled to the adjust module (FIG. 3) by comparison lead 328 and outputs the time difference signal ΔT.

Figure 6A:
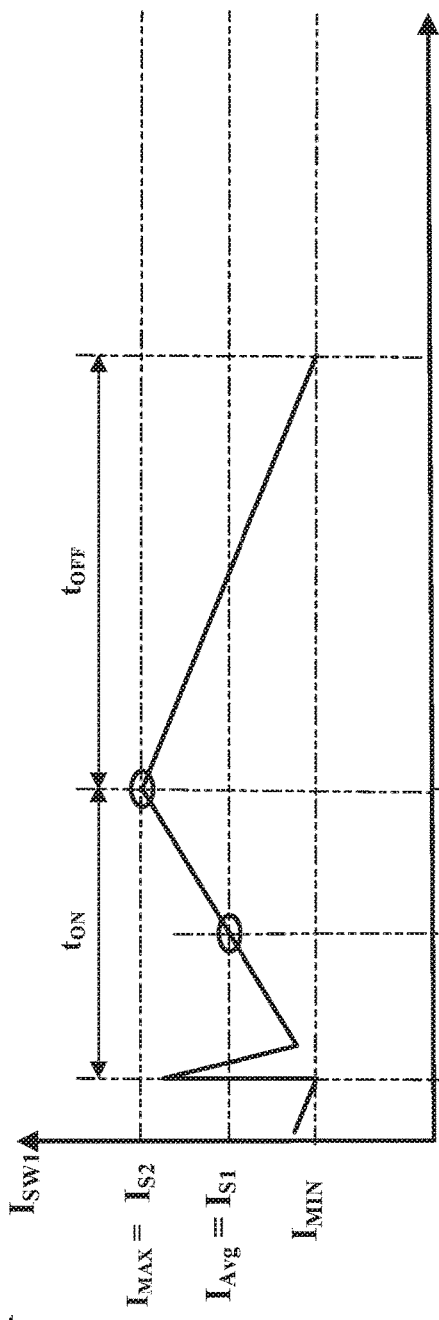
FIG. 6A illustrates the first switch current response over time of a buck converter module as regulated in accordance with at least the embodiment of FIG. 5 of the present disclosure.
Figure 6B:
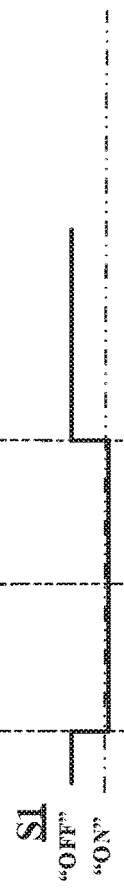
FIG. 6B illustrates the operating states over time of a first switch used in accordance with at least the embodiment of FIG. 3 of the present disclosure.
Figure 6C:
FIG. 6C illustrates detected average current levels over time for a driver module in accordance with at least the embodiment of FIG. 3 of the present disclosure.
Figure 6D:
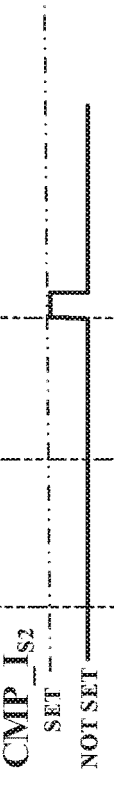
FIG. 6D illustrates detected maximum current levels over time for a driver module in accordance with at least the embodiment of FIG. 3 of the present disclosure.
Figure 6E:
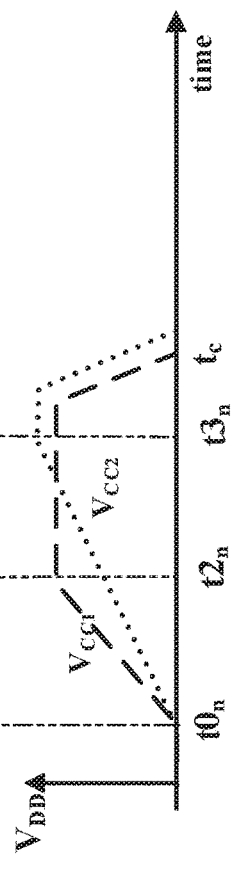
FIG. 6E illustrates the voltages on capacitors $C_{C1}$ and $C_{C2}$ over time provided by a driver module to a load in accordance with at least the embodiment of FIG. 5 of the present disclosure.

With reference now to FIGS. 6A-6D, the principles of operation of the compare module of FIG. 5 is shown. As described above, during the operation of the driver module 300, the current in the coil 122 fluctuates between a minimum value $I_{MIN}$ and a maximum value $I_{MAX}$, with the timing of the "on" and "off" cycles of the buck converter module 104 being controlled by the first switch 116, such that an average current provided to the LED units over any given cycle equals a target average current. In FIG. 6E the voltages on the first compare capacitor 510 and the second compare capacitor 512 are shown. When voltage $V_{CC2}$ is greater than voltage $V_{CC1}$ the duration T2 is too long compared to T1 and vice versa. Compare module 500 accordingly adjusts the output of the time difference signal ΔT to correct for such time duration disparities and ideally reaches an equilibrium condition where both periods T1 and T2 are the same.

More specifically, the first and second compare capacitors, 510 and 512 respectively, are initially discharged with both of the first and second discharge switches, 514 and 516 respectively, being configured in a "closed" state. During the T1 portion of the "on" period, both the first capacitor 510 and the second capacitor 512 are charged. For at least the embodiment shown in FIG. 5, during the T1 portion of the "on" period, the first capacitor 510 is charged with twice the current provided to the second capacitor 512. The first capacitor 510 continues to charge until the CMP_$I_{S1}$ signal toggles such that the first compare switch 506 is configured from the "closed" to the "open" state. Similarly, the second capacitor 512 is charged until the CMP_$I_{S2}$ signal toggles at the end of period T2, at which instance the second compare switch 508 is configured from the "closed" to the "open" state. The second capacitor 512 is charged during both of periods T1 and T2. If both periods T1 and T2 are the same, at the end of the "on" period the voltage on both capacitors 510 and 512 should be the same. If these periods are not the same, there is a voltage difference between the capacitor voltages, such voltage differences can be sensed by comparator 518 and the results used for adjustment of the system. Comparator 518 can be any known type of comparator including, for example, a window comparator, a simple comparator or otherwise. In FIG. 6E, the $V_{CC1}$ voltage is the voltage on the first compare capacitor 510 and $V_{CC2}$ voltage is the voltage on the second compare capacitor 512. FIG. 6E shows an example where period T2 is slightly longer than period T1. Per this example, second compare capacitor 512 is charged to a slightly higher voltage than first compare capacitor 510. It is to be appreciated that simple comparator 518 can accordingly indicate if $V_{CC1}$ is higher or lower than $V_{CC2}$, while a window comparator can have defined window where it indicates that the two voltages are close (substantially equal) or if one or the other voltage is higher.

In another embodiment, it is to be appreciated that a single current source may be utilized and during period T1 used for charging first compare capacitor 510 and during period T2 used for charging second compare capacitor 512. It is also to be appreciated that additional control circuitry (not shown) may be utilized to regulate the maximum voltage on one and/or both of the first and second compare capacitors 510 and 512 by adjusting the value of the currents $I_{C1}$ and $I_{C2}$ provided to such capacitors.

Figure 7:
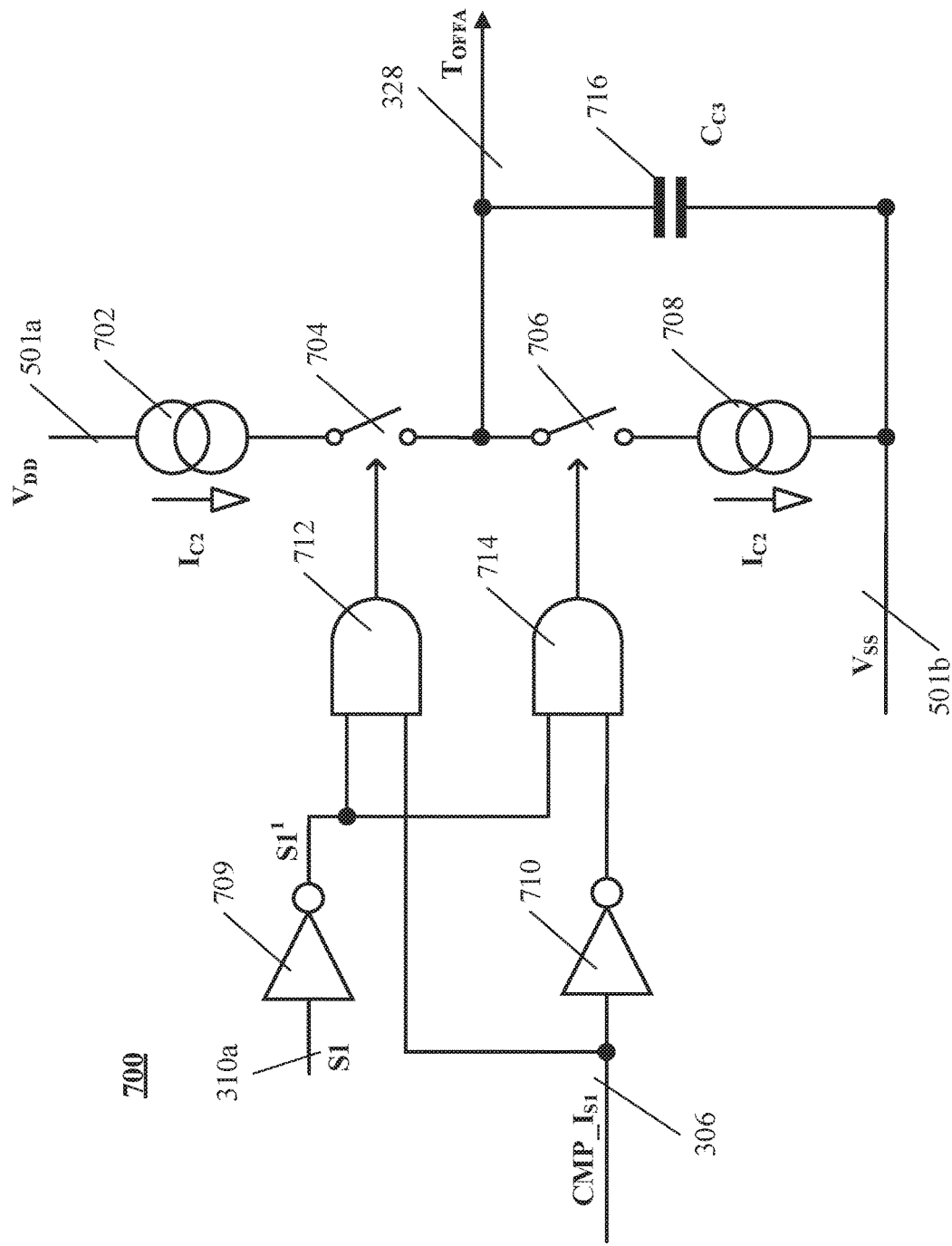
FIG. 7 is a schematic diagram of a time off module for use in accordance with at least the embodiment of FIG. 3 of the present disclosure.

Referring now to FIG. 7, a second embodiment of a compare module 700 is shown. As shown, the compare module 700 includes a third current source 702 that is coupled to source providing power at a voltage $V_{DD}$ by source lead 501a. The circuit is also coupled to a ground or other connection at a voltage potential of $V_{SS}$ by ground lead 501b. The third current source 702 is coupled to a second compare switch 704. Second compare switch 704 is coupled to a third compare switch 706 to a third compare capacitor 716 and to comparison lead 328. Third compare switch 706 is coupled to a fourth current source 708. The operation of the second compare switch 704 is controlled by the output of a first AND gate 712. The operation of the third compare switch 706 is controlled by the output of a second AND gate 714. The first and second AND gates 712 and 714 each receive, from first inverter 709, an inverted S1 signal, the $S1^1$ signal, and CMP_$IS_1$ signals provided, respectively, by the control module 318 and current sensor module 302, with the CMP_IS$_1$ being inverted by inverter 710 prior to being provided to the second AND gate 714. Per this embodiment, comparisons are made between the T1 and T2 periods. More specifically, during period T1, sixth compare switch 706 is closed while switch 704 is open. During period T2 the inverse condition arises with switch 706 being open and switch 704 being closed. During period T$_{off}$ both switches are open. During period T1 capacitor C$_{C3}$ is discharged by current I$_{C2}$ and during period T2 capacitor C$_{C3}$ is charged by current I$_{C2}$. If periods T1 and T2 are the same, voltage on the capacitor C$_{C3}$ after one cycle should stay the same, if periods T1 and T2 are different, voltage on capacitor C$_{C3}$ goes up or down. Per at least this embodiment, adjustments to the value of the I$_{S2}$ current to be made are represented by the T$_{OFFA}$ signal. In another embodiment T$_{off}$ time can be adjusted to produce correct average output current.

In accordance with at least one embodiment of the present disclosure, it is also to be appreciated that only a single comparator having two switchable threshold levels may be utilized in current sensor modules 302, 804 and 1002 (modules 804 and 1002 being respectively described below in conjunction with FIGS. 8 and 10) to determine when I$_{S1}$ and I$_{S2}$ values are reached instead of using the two comparators discussed above. In accordance with at least one embodiment of the present disclosure, it is also to be appreciated that I$_{S1}$ does not always have to equal I$_{AVG}$. Instead, I$_{S1}$ may be set closer to I$_{S2}$ to work with shorter "on" periods or closer to I$_{MIN}$ when it is desirable to work with longer "on" periods. Per such an embodiment, I$_{S1}$ may be expressed as a ratio of I$_{S2}$. It is to be appreciated that in accordance with at least one embodiment of the present disclosure, buck converter module 104 may be replaced with a solenoid driver or other electrical device structures with respect to which the control of the average current provided to such device is desired.

Figure 8:
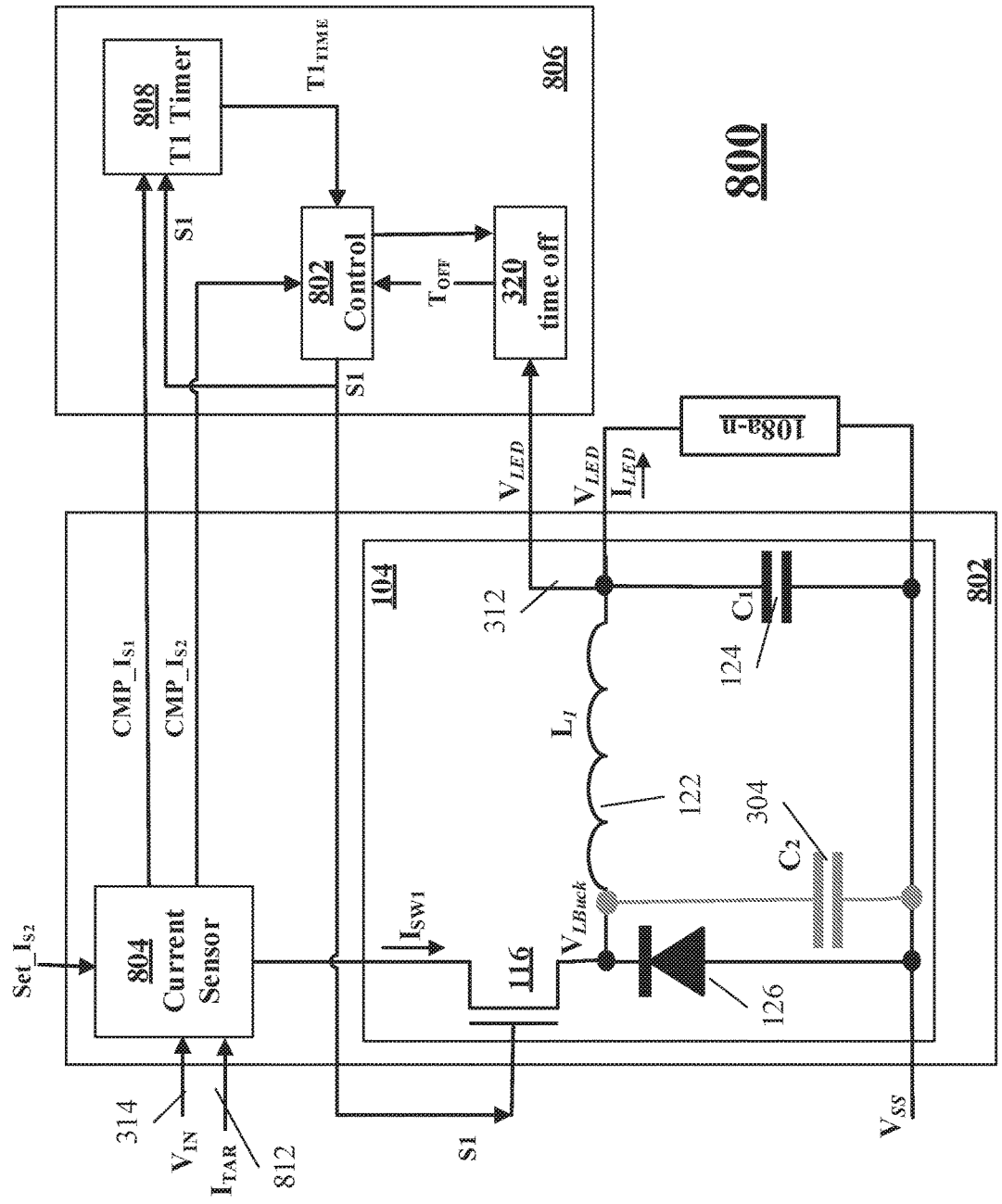
FIG. 8 is a schematic diagram of a system including a driver module and a second regulating module for use in accordance with at least one embodiment of the present disclosure.

Referring now to FIG. 8, another embodiment of the present disclosure includes a second system 800 includes a second driver module 802 including a buck converter module 104, and a second current sensor module 804. Second driver module 802 is coupled to a second regulating module 806 and to a load, such as one or more LED units 108$a$-$n$. As further shown in FIG. 8 and as described above with respect to FIGS. 3 and 4A-4C, driver module includes a first switch 116 which is used to control the "on" and "off" operating states of buck converter module 104. The principles of operation, such as when the first switch 116 is set into an "open" or "closed" state, of the second driver module 802 and first driver module 300 are the same as described above with respect to at least one embodiment of the present disclosure.

However, unlike the embodiment of FIG. 3 where the regulating module 806 may be configured to utilize both the maximum current I$_{MAX}$=I$_{S2}$ and the average current I$_{S1}$ in regulating the operation of a driver module, per at least the embodiment of FIG. 8, the regulating module 806 may be configured to utilize only the average current I$_{S1}$ and output signal CMP_IS$_1$, which is indicative thereof, to control the operation of driver module 802. As shown, second current sensor module 804 may be configured to output the CMP_IS$_1$ signal to a timer module 808. Per this embodiment, an assumption is made that the T1 period is always equal to T2 (periods T1 and T2 being shown for at least one embodiment in FIG. 4C). Per at least this embodiment, the average current I$_{AVG}$ is defined to occur when T1=T2=(½) t$_{ON}$. Further, the second current sensor module 804 may be configured to include a comparator set to the target output current I$_{TAR}$ for the buck driver module 104 such that I$_{AVG}$=I$_{TAR}$. In accordance with at least one embodiment, I$_{TAR}$ may be provided to the second current sensor 804 via second target current lead 812. In accordance with at least one embodiment, the I$_{TAR}$ value may be a preset parameter of the second current sensor module 804.

FIG. 8 represents a system embodiment of the present disclosure which uses an average current comparator. For at least this embodiment, I$_{S1}$ is used for average current regulation, while I$_{S2}$ may be used to limit sub-harmonic oscillations that may arise during system start-up or other disturbances. Per at least one such embodiment, each of the period t$_{OFF}$ and the maximum current I$_{S2}$ threshold may be preliminary defined to meet a specific current with a desired range of accuracy. More specifically, the desired maximum current I$_{MAX}$=I$_{S2}$ and the off period for the buck converter module t$_{OFF}$ may be regulated such that a constant current ripple is produced, as per Equations 2 and 3.

$$I_{AVG} = I_{MAX} - \frac{\Delta R_{AVG}}{2} \qquad \text{Equation 2}$$

$$\Delta R_{AVG} = \frac{t_{OFF} \cdot (V_{LED} + V_{LBUCK})}{L_1} \cong \frac{t_{OFF} \cdot V_{LED}}{L_1} \qquad \text{Equation 3}$$

Per Equations 2 and 3 above: t$_{OFF}$ may be regulated such that it is inversely proportional to V$_{LED}$ and thereby satisfy a desired average current through and operating frequency for a given coil value L$_1$.

According to at least one embodiment, the principles of operation of the embodiment of FIG. 8 include: first, activating the buck converter module 104. Upon activation of the buck converter module, the I$_{S1}$ threshold, as sensed by second current sensor 804, is detected and communicated as the CMP_I$_{S1}$ signal to second control module 802. At system startup, T1 timer module 808 sets T1=T2. Second control module 802 also receives from the time off module 320 the T$_{OFF}$ signal. Based on these signals, second control module 802 controls the "on" and "off" states of the buck converter module 104 until a steady state operating condition is reached. It is to be appreciated that the second control module 802 controls the operating state of the buck converter module 104 by outputting the corresponding S1 signal which, as discussed above toggles the state of the first switch 116 from "open" to "closed" states. In accordance with at least one embodiment, it is to be appreciated, however, that the steady state operating condition may be different than an operating condition used at start-up due to variations in the coil 122 value L$_1$, different temperatures and/or differences in V$_{IN}$ and V$_{LED}$ over time. As such, it is to be expected for at least one embodiment of the present disclosure that the average current I$_{AVG}$ will not exactly be equal to the target current I$_{TAR}$ under all operating conditions.

During T1, the time needed to reach the I$_{S1}$=I$_{AVG}$=I$_{TAR}$ (under ideal situations) threshold provides the delay T2 between the I$_{S1}$ threshold and the switching "off" of the switch at time t3$n$ (as shown in FIGS. 4A-4C). More specifically, current sensor module 804 monitors the I$_{SW1}$ current and when I$_{S1}$=I$_{TAR}$ outputs the CMP_I$_{S1}$ signal to the timer module 808. The timer module 808 measures the duration from the start of the "on" cycle, as indicated by the S1 signal, to the time of receipt of the CMP_I$_{S1}$ signal, with the total duration being indicative of the T1 period. T2 is then adjusted, as necessary, to be the same as the immediately previously measured T1 period. After the adjusted T2 period elapses, the timer module 808 outputs to the second control module 812 a measured time signal, the T1$_{TIME}$ signal. Upon receipt of the T1$_{TIME}$ signal, the second control module 812 outputs S1 which opens the first switch 116 and ends the torr period.

It is to be appreciated that per at least one embodiment of the present invention as described with respect to the FIG. 8 embodiment, the system 800 may be subjected to sub-harmonic oscillations. Per at least one embodiment, such sub-harmonic oscillations may be reduced by averaging T1 over several intervals when generating T1$_{TIME}$ by timer module 808, by using filtering, and otherwise. Further, the comparator I$_{S2}$ capabilities of the second current sensor 804 may be utilized in accordance with at least one embodiment to provide over current protection, and to reduce sub-harmonic oscillations.

Figure 9:
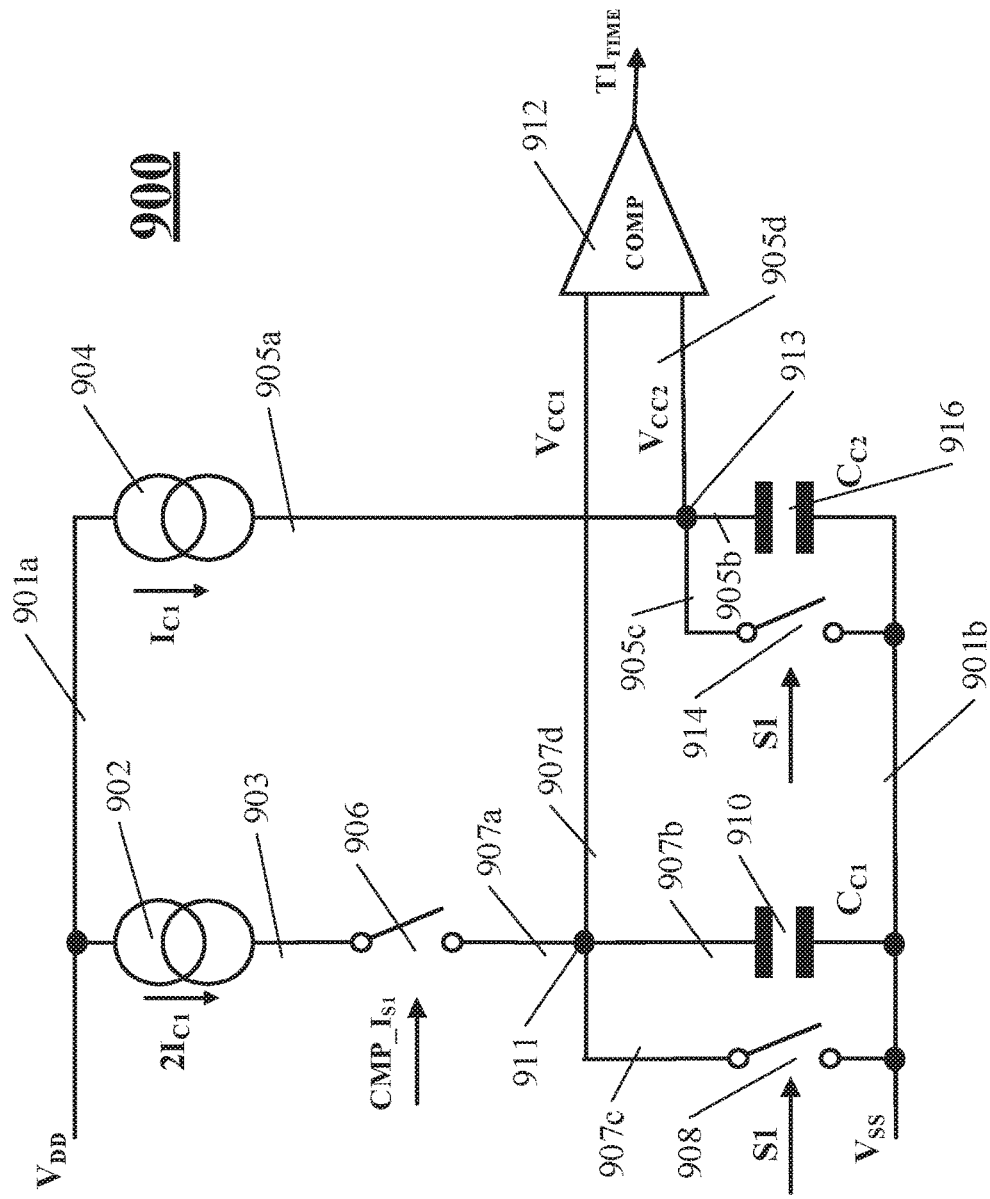
FIG. 9 is a schematic diagram of a compare module for use in accordance with at least the embodiment of FIG. 8 of the present disclosure.

Referring now to FIG. 9, one embodiment of a timer module 900 includes a source lead 901a providing a voltage V$_{DD}$ and a ground lead 901b. The source lead 901a is coupled to each of a first current source 902 and a second current source 904. As per the at least the embodiment discussed above with respect to FIG. 5, the first current source generates a current 2I$_{C1}$ that is twice the current generated by the second current source I$_{C1}$. The first current source 902 is coupled to a first timer switch 906 by lead 903. The first timer switch 906 is opened or closed based upon the respective absence or presence of the COMP_I$_{S1}$ signal. The first timer switch 906 is coupled at first timer junction 911 and via leads 907a-d to a second timer switch 908, a first timer capacitor 910 having a capacitance C$_{C1}$ and a second comparator 912. The second current source 904 is coupled at second timer junction 913 by leads 905a-d to a second timer switch 914, a second timer capacitor 916 having a capacitance C$_{C2}$ and to second comparator 912.

In accordance with at least one embodiment, the principles of operation of the timer module 900 which counts T2 to be equal to T1 are as follows. During T1 the first timer capacitor 910 is charged with a current 2I$_{C1}$. During the complete t$_{ON}$ period, the second timer capacitor 916 is charged with a current I$_{C1}$. With the charging of the first timer capacitor 910 only during the T1 period, while the charging of the second timer capacitor 916 continues after the T1 period, comparator 912 is triggered when both voltages across the capacitors are equal. More specifically, when T1+T2=2T1 the T1$_{TIME}$ signal is output by second comparator 912. At that moment, the second control module 812 switches off the first switch 116 and ends the t$_{ON}$ phase. At substantially the same time and before T1 and after T2 are set to be substantially the same periods, and when the crossing of the target average current I$_{TAR}$ is set to be defined by the I$_{S1}$ level, the effective average buck current I$_{AVG}$ for the system 800 is substantially equal to the target current I$_{TAR}$.

Figure 10:
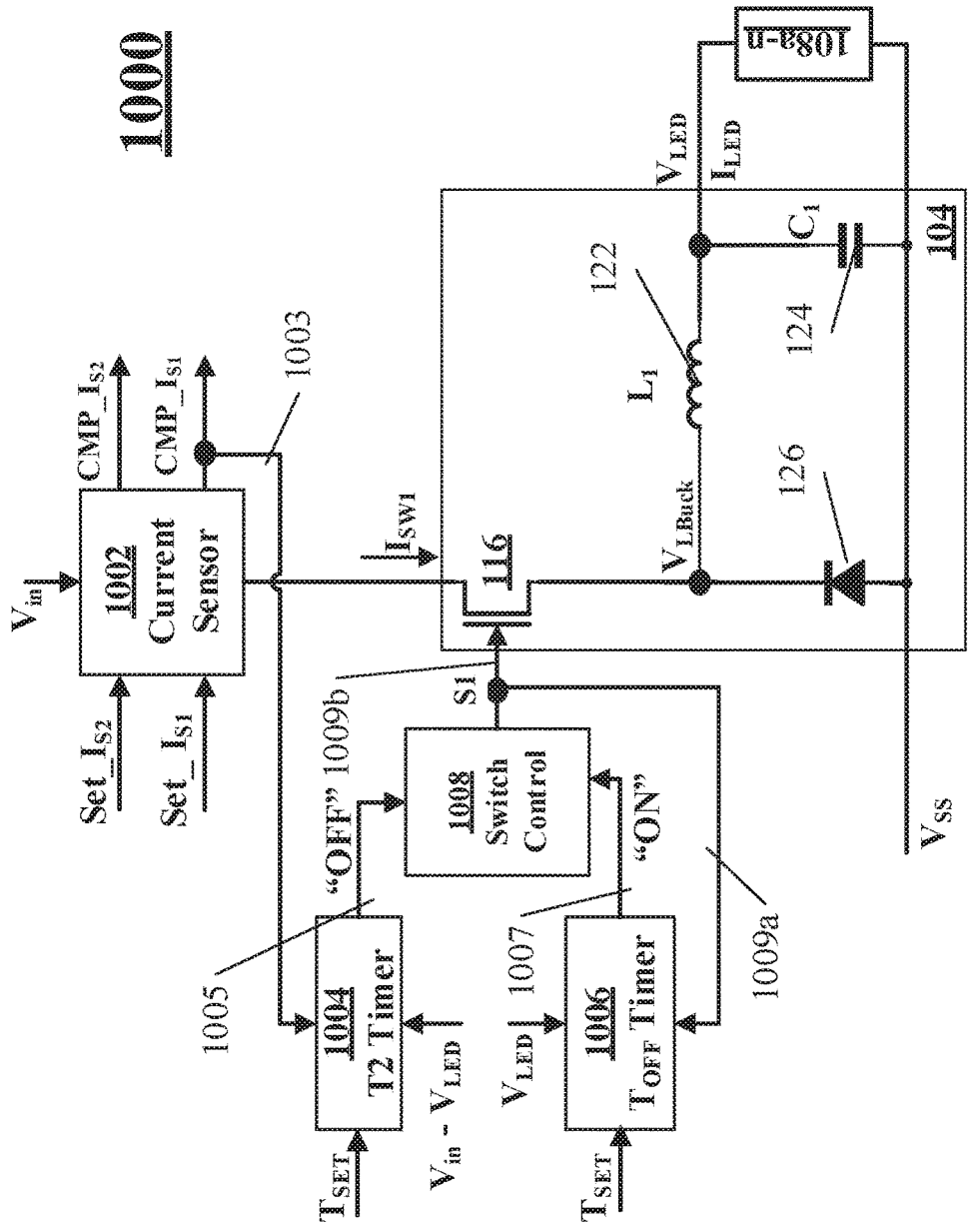
FIG. 10 is a schematic diagram of a system including a driver module and a control module for use in accordance with at least one embodiment of the present disclosure.

Referring now to FIG. 10, at least one embodiment of the present disclosure includes a system 1000 for regulating a buck converter 104 wherein the T2 period is defined to be dependent on the difference ΔV between the input voltage V$_{IN}$ and the LED voltage V$_{LED}$ where ΔV=V$_{in}$−V$_{LED}$. As shown in FIG. 10, the system 1000 includes a current sensor module 1002 that receives the input voltage V$_{IN}$ and specified threshold values Set_I$_{S1}$ and Set_I$_{S2}$ for the desired I$_{S1}$ and I$_{S2}$ current levels. It is to be appreciated that these thresholds may be pre-determined and/or hard-wired into the current sensor 1002 or may be adjustable inputs to the current sensor 1002, as shown in FIG. 10. The current sensor module 1002 outputs the CMP_I$_{S1}$ and CMP_I$_{S2}$ signals when the corresponding current levels for the I$_{SW1}$ current are detected. Additionally, the current sensor module 1002 is coupled via lead 1003 to a T2 timer module. The CMP_I$_{S1}$ signal is communicated to the T2 Timer module 1004 via lead 1003. The T2 timer module 1004 may also be configured to receive or internally possess a T$_{SET}$ value. In accordance with at least one embodiment, T$_{SET}$ is a constant and is used to calculate the t$_{OFF}$ and T2 periods as further described below. In accordance with at least one embodiment, the value of T$_{SET}$ may be adjusted and/or adjustable. The T2 timer module 1004 is also configured to receive, or calculate, the difference between V$_{in}$ and V$_{LED}$ for each cycle of the buck converter module 104. The T2 timer module 1004 is coupled via lead 1005 to a switch control module 1008. The switch control module 1008 controls the operating states of the first switch 116. The switch control module 1008 is coupled to a T$_{OFF}$ timer module 1006 and to the first switch 116 via lead 1009, branches 1009a and 1009b respectively.

Figure 4D:
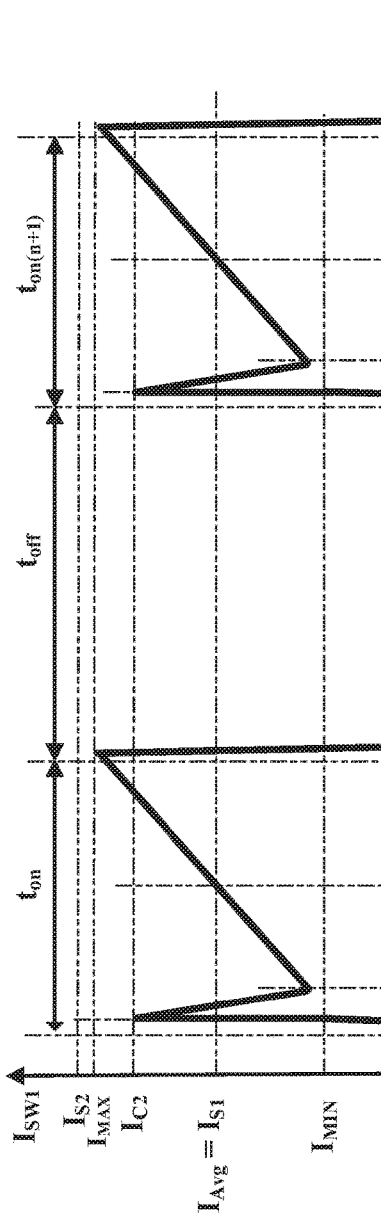
FIG. 4D illustrates the first switch currents over time of a driver module used in accordance with at least one embodiment of the present disclosure in which an optional buck voltage comparator is utilized.
Figure 4E:
FIG. 4E illustrates the operating states of a first switch used in accordance with at least one embodiment of the present disclosure in which an optional buck voltage comparator is utilized.
Figure 4F:
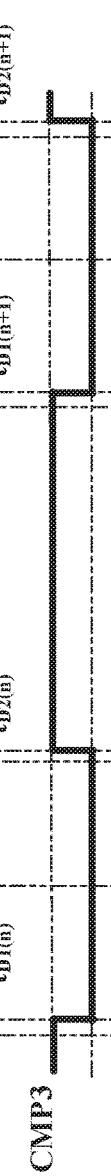
FIG. 4F illustrates the outputs of a voltage comparator sensing the voltages provided to a coil of a buck converter module over time in accordance with at least one embodiment of the present disclosure.
Figure 4G:
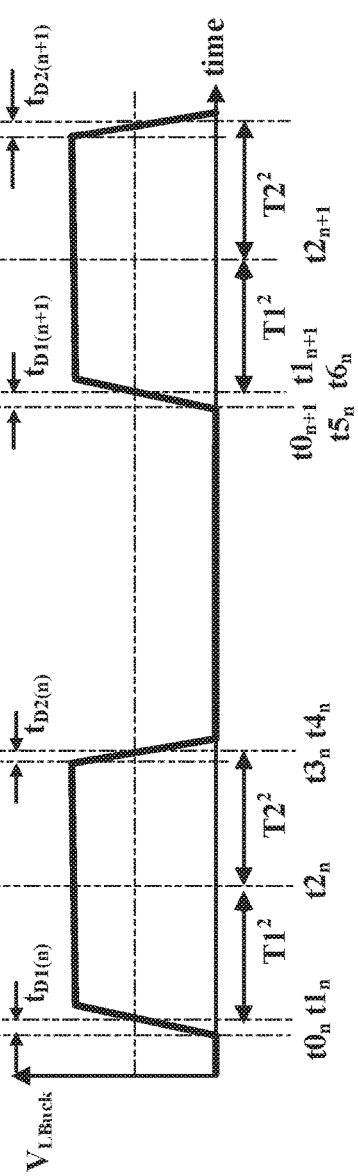
FIG. 4G illustrates the voltages provided over time to a coil of a buck converter module in accordance with at least one embodiment of the present disclosure in which an optional buck voltage comparator is utilized.

The principles of operation of the system 1000 are described below in conjunction with Equations 4-8. First, the system 1000 is configured to operate such that the current I$_{SW1}$ is independent of the inductance L$_1$ of the coil 122. Further, the system 1000 operates such that I$_{AVG}$=I$_{S1}$ as defined below in Equation 4. As shown in FIGS. 4A and 4D, it is to be appreciated that I$_{MAX}$<I$_{S2}$, where I$_{MAX}$ is the maximum current in the coil and is defined by the system timing and I$_{S2}$ is a protection maximum level of current for the coil. Further, t$_{OFF}$ is defined based on the LED voltage V$_{LED}$ and T$_{SET}$ as set forth by Equation 5. T2 is defined based on T$_{SET}$ and ΔV as set forth in Equation 6, where ΔV=V$_{in}$−V$_{LED}$. The difference between the maximum current I$_{MAX}$ and the target current I$_{TAR}$=I$_{S1}$, as well as the difference between the maximum current I$_{MAX}$ and the minimum current I$_{MIN}$, are defined in terms of ΔV, T$_{SET}$ and L$_1$, as set forth respectively by Equations 7 and 8. And, I$_{AVG}$ is defined in terms of the voltage differences, T$_{SET}$ and the inductance L$_1$ as set forth in Equation 7.

$$I_{AVG} = \frac{I_{MAX} + I_{MIN}}{2} = I_{S1} \qquad \text{Equation 4}$$

$$t_{off} = \frac{T_{SET}}{V_{LED}} \qquad \text{Equation 5}$$

$$T2 = \frac{T_{SET}}{\Delta V} \frac{1}{2} \qquad \text{Equation 6}$$

$$I_{MAX} - I_{S1} = \frac{\Delta V * T2}{L_1} = \frac{\Delta V}{L_1} * \frac{T_{SET}}{\Delta V} * \frac{1}{2} = \frac{T_{SET}}{L_1} * \frac{1}{2} \qquad \text{Equation 7}$$

$$I_{MAX} - I_{MIN} = \frac{V_{LED} * t_{off}}{L_1} = \frac{V_{LED}}{L_1} * \frac{T_{SET}}{V_{LED}} = \frac{T_{SET}}{L_1} \qquad \text{Equation 8}$$

As shown by Equations 4-8, it is to be appreciated that $I_{AVG}$ is independent of $L_1$ and can be determined, for at least one embodiment, by the Set_$I_{S1}$ threshold. More specifically, based on the calculated $I_{MAX}$ per Equation 7 and the calculated $I_{MIN}$ per Equation 8, $I_{AVG}=I_{S1}$ can be calculated as per Equation 4. Based on the above principles of operation, the system 1000 operates such that the respective T2 timer module 1004 and $T_{OFF}$ timer module 1006 communicate respective "OFF" and "ON" signals to the switch control module 1008, such that the buck converter module 104 operates within the above defined $I_{MAX}$ and $I_{MIN}$ currents and within the desired $t_{ON}$ and $t_{OFF}$ periods. It is to be appreciated that the advantages of the approach of system 1000 include, but are not limited to, the system 1000 operates by sensing, versus regulating, the real average current. It is to be appreciated that a system which operates by sensing, versus regulating, currents requires less circuit complexity. Further, the approach of system 1000 does not require sensing of the $I_{LED}$ current. Instead, currents present only during the "on" period of the buck converter module 104 are sensed, thereby resulting in lower power dissipation and less technical complexity. Further, currents generated during blank periods $t_{D1}$ and $t_{D2}$ do not influence the accuracy of the average current regulation as such currents are subsumed within the $I_{MAX}$ and $I_{MIN}$ thresholds.

Further, it is to be appreciated that the approach of system 1000 and one or more of the various other embodiments of the present disclosure permits regulation of a buck converter with a fixed current ripple as the operation of the buck converter is governed, at least in part, based on the $I_{MAX}$ and $I_{MIN}$ levels. It is to be appreciated that the approach of system 1000 and other embodiments of the present disclosure may also be configured to operate with a fixed frequency, with the addition of a commonly known form of a frequency regulation loop. Examples of such a frequency regulation loop are described, for example, in the '937 application, with particular reference to FIGS. 4A-4C and FIG. 5 and to paragraphs [0040]-[0067] therein.

It is also to be appreciated that the system 1000 permits fast regulation and adjustments within one cycle of the buck converter. Such responsiveness can be desirable, for example, for use with pixel light and similar applications. Further, the system 1000 may be operated without requiring any compensation or feedback circuits or components. Further, it is to be appreciated that the system 1000 can compensate for external component induced errors such as fluctuations in battery voltages, output voltages and otherwise.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. An apparatus for powering an electrical load, comprising:
   a driver module comprising:
      a buck converter module comprising at least one output node configured to provide electricity at an output voltage and at an output current;
      a first switch configured to operably couple a power source to the buck converter module during a time-on operating state occurring over a first time period of an operating cycle;
      wherein the operating cycle comprises the first, time-on operating state and a time-off operating state;
      a current sensor module configured to sense an electrical current provided to the buck converter module while the apparatus is operating in the first, time-on operating state;
   a regulating module operable to instruct and regulate time periods during which the first switch is configured into at least one of the first, time-on operating state, and the time-off operating state such that an average current provided to the buck converter module is equal to a desired target current.

2. The apparatus of claim 1, wherein the time-on operating state occurs during each of a first period and a second period.

3. The apparatus of claim 2, wherein the first period occurs during a time interval arising from an initial time until a second time, wherein the initial time occurs when the first switch is configured into the time-on operating state and the second time occurs when a first sensed current is detected by the current sensor module.

4. The apparatus of claim 3, wherein the first sensed current is detected by the current sensor module when the electrical current provided to the buck converter module reaches a target current.

5. The apparatus of claim 3, wherein the second period occurs during a time interval arising from the second time until a third time, wherein the third time occurs when a second sensed current is detected by the current sensor module.

6. The apparatus of claim 1,
   wherein the current sensor module is configured to detect when a first sensed current through the first switch during the time-on operating state equals a target current and upon such detection output a first comparison signal; and
   wherein the current sensor module is configured to detect when a second sensed current through the first switch during the time-on operating state equals a desired maximum current threshold and, upon such detection, output a second comparison signal.

7. The apparatus of claim 6, wherein the regulating module comprises:
   a control module coupled to current sensor module and configured to receive the second comparison signal;
      wherein the control module is coupled to the first switch and configured to output a switch signal to the first switch which sets the operating state of the first switch into a closed switch state;
   a time-off module coupled to the output node of the buck converter module and configured to receive the output voltage;
      wherein the time-off module is configured to detect a decrease in the output voltage during a transitioning of the first switch from the time-on operating state to the time-off operating state and upon detecting such decrease in the output voltage output a time-off signal to the control module.

8. The apparatus of claim 7, further comprising
a compare module coupled to the current sensor module and the control module and configured to receive the switch signal, the first comparison signal and the second comparison signal;
wherein based on when the switch signal, first comparison signal and second comparison signal are each received, the compare module determines an initial event time, a second event time and a third event time, calculates a first period based on an amount of time elapsed between the initial event time and the second event time, calculates a second period based on an amount of time elapsed between the second event time and the third event time, compares the first period to the second period, and based on the comparison of the first period to the second periods outputs a difference signal.

9. The apparatus of claim 8, further comprising an adjust module;
wherein the adjust module is coupled to and configured to receive signals from the compare module;
wherein the adjust module is coupled to and configured to output signals to the current sensor module;
wherein, upon receipt of the difference signal from the compare module, the adjust module determines an amount of adjustment for the desired maximum current threshold and outputs an adjust signal to the current sensor module.

10. The apparatus of claim 7, further comprising:
a timer module coupled to the current sensor module and the control module and configured to receive the switch signal and the first comparison signal; and
wherein the timer module is coupled to the control module and is configured to output a measured time signal to the control module.

11. The apparatus of claim 10,
wherein the first, time-on operating state occurs during a first period and a second period;
wherein the measured time signal indicates a duration of the first period for a current cycle of the buck converter module;
wherein the timer module adjusts the length of the second period to be equal to the first period; and
when the adjusted second period ends, the timer module outputs the measured time signal;
whereupon receipt of the measured time signal, the control module stops outputting the switch signal and the time-off operating state of the buck converter module begins.

12. The apparatus of claim 1, comprising a voltage comparator module configured to receive input voltages provided to the buck converter module.

13. The apparatus of claim 12, wherein the voltage comparator module is coupled to and configured to output the regulating module a comparison signal indicative of a period of delay in the input voltages provided to the buck converter module.

14. The apparatus of claim 13, wherein the comparison signal indicates a turn-on delay.

15. The apparatus of claim 14, wherein the comparison signal indicates a turn-off delay.

16. An apparatus for determining when currents generated by a buck converter module reach at least two current thresholds, comprising:

a first current source coupled to a power source providing electricity at a first voltage and configured to output a first current;
a first compare switch coupled to the first current source and to the first circuit junction and configured to respond to a first control signal;
a first compare capacitor having a first capacitance and coupled to the first circuit junction;
a first discharge switch coupled to the first circuit junction and configured to respond to a third control signal;
a second current source coupled to the power source and configured to output a second current;
wherein the second current source is coupled to a second circuit junction;
a second compare capacitor having a second capacitance and coupled to the second circuit junction;
a second discharge switch coupled to the second circuit junction and configured to respond to the third control signal; and
a comparator coupled to the first circuit junction, the second circuit junction and to a comparison lead;
wherein the first current is two times the second current and the first capacitance equals the second capacitance;
wherein the first control signal comprises a first comparison signal received from a current sensor module utilized to control the operating states of a buck converter module;
wherein upon receipt of the first control signal, the first compare switch is configured to change from a closed state to an open state;
wherein the third control signal comprises a switch signal received from a control module utilized to control the operating state of the buck converter module;
wherein upon receipt of the third control signal, each of the first discharge switch and the second discharge switch are configured to change from an open state to a closed state;
wherein the buck converter module operates over at least one duty cycle comprising a time-on period and a time-off period;
wherein the time-on period comprises a first period and a second period;
wherein the first period occurs from an initial event time to a second event time and the second period occurs from the second event time to a third event time;
wherein the first control signal is received by the first compare switch when the second event time occurs; and
wherein the third control signal is present during the time-on period.

17. The apparatus of claim 16, wherein a second compare switch couples the second current source to the second circuit junction;
wherein the second compare switch is configured to respond to a second comparison signal received from the current sensor module; and
wherein upon receipt of the second comparison signal, the second compare switch is configured to change from a closed state to an open state.

18. An apparatus for or powering an electrical load, comprising:
a buck converter module comprising at least one output node configured to provide electricity at an output voltage and at an output current;

a first switch configured to operably couple a power source to the buck converter module during a time-on operating state occurring over a first time period of an operating cycle;
    wherein the operating cycle comprises the time-on operating state and a time-off operating state;
a current sensor module configured to sense an electrical current provided to the buck converter module during the time-on operating state; and
a regulating module operable to instruct and regulate time periods during which the first switch is configured into at least one of the time-on operating state and the time-off operating state such that average current provided to the buck converter module is equal to a desired target current;
    wherein the regulating module further comprises a switch control module configured to control the time-on operating state such that the first time period equals second time period during each operating cycle of the buck converter module.

19. The apparatus of claim 18, wherein the regulating module further comprises:
a timer module coupled to the current sensor module and to the switch control module;
    wherein the timer module is configured to receive a first comparison signal from the current sensor module, and a difference signal, wherein the difference signal indicates a difference arising between an input voltage provided to the buck converter module and an output voltage generated by the buck converter module during the time-on operating state of a given operating cycle;
    wherein the timer module is configured to output an off signal to the switch control module, wherein the off signal instructs the switch control module to transition the first switch from a closed state to an open state;
a second timer module coupled to the switch control module;
    wherein the second timer module is configured to receive a load voltage signal and a switch signal, wherein the switch signal is received from the switch control module;
    wherein the second timer module is configured to output an on signal to the switch control module, wherein the on signal instructs the switch control module to transition the first switch from an open state to a closed state.

20. The apparatus of claim 19, wherein the timer module is configured to receive a first set signal.

* * * * *